(12) United States Patent
Ko et al.

(10) Patent No.: US 8,974,218 B2
(45) Date of Patent: Mar. 10, 2015

(54) MOLD PLATE AND METHOD OF MOLDING GOLF BALL CORE

(75) Inventors: Chin-Shun Ko, Kaohsiung (TW); Chien-Hsin Chou, Yun-lin Hsien (TW); Chen-Tai Liu, Yun-lin Hsien (TW)

(73) Assignee: NIKE, Inc., Beaverton, OR (US)

( * ) Notice: Subject to any disclaimer, the term of this patent is extended or adjusted under 35 U.S.C. 154(b) by 293 days.

(21) Appl. No.: 13/456,930

(22) Filed: Apr. 26, 2012

(65) Prior Publication Data
US 2013/0285287 A1  Oct. 31, 2013

(51) Int. Cl.
*B29C 33/12* (2006.01)

(52) U.S. Cl.
USPC ........... 425/400; 425/394; 425/395; 425/398; 425/399; 425/403

(58) Field of Classification Search
CPC ........ B29C 43/04; B29C 43/36; B29C 51/20; B29C 51/30; A63B 37/0003; A63B 45/00; A63B 37/005; B29D 22/04
USPC .................. 425/394, 395, 398, 399, 400, 403
See application file for complete search history.

(56) References Cited

U.S. PATENT DOCUMENTS

| | | | |
|---|---|---|---|
| 3,963,402 A * | 6/1976 | Berta | 425/299 |
| 6,290,797 B1 | 9/2001 | Gosetti et al. | |
| 2003/0207728 A1 | 11/2003 | Reid, Jr. et al. | |
| 2004/0232577 A1 | 11/2004 | Brum | |
| 2009/0166924 A1 * | 7/2009 | Kuttappa | 264/277 |
| 2010/0182368 A1 | 7/2010 | Matsui et al. | |
| 2011/0136985 A1 * | 6/2011 | Moon et al. | 525/326.2 |

FOREIGN PATENT DOCUMENTS

GB  1511847 A  5/1978

OTHER PUBLICATIONS

European Search Report for EP Application No. 13164661.4 mailed Jun. 2, 2014.

* cited by examiner

*Primary Examiner* — Timothy Kennedy
*Assistant Examiner* — David N Brown, II
(74) *Attorney, Agent, or Firm* — Honigman Miller Schwartz and Cohn LLP; Matthew H. Szalach

(57) ABSTRACT

A mold for manufacturing hemispherical sections for a golf ball includes a mold plate and a movable insert. The mold plate includes a first surface. The movable insert includes a second surface. The movable insert is connected to the mold plate. The first surface of the mold plate and the second surface of the movable insert may move relative to one another during molding of a hemispherical section for a golf ball.

10 Claims, 20 Drawing Sheets

MOLD PLATE AND METHOD OF MOLDING GOLF BALL CORE

BACKGROUND

A wide range of technologies related to the design and manufacture of golf balls are known in the art. The material selected depends on the play conditions desired for the ball. The core material selected affects how the ball performs and how a golfer perceives the feel of the ball. It is desirable that the ball has a certain degree of compression and durability.

For instance, some golfers desire balls that have a lower compression. A lower compression golf ball allows a golfer to have a greater degree of control and a higher margin for error on golf shots, particularly when club head speed is low. A lower club head speed is common when a golfer is less experienced.

A designer may select a harder core material and in other instances the designer may select a softer core material, with the golf ball being made of various materials. Balls that have compatible layers will have a relatively longer life expectancy than balls that are made of layers that are incompatible. For example, if a ball is formed with too hard an outer layer and too soft a core, the outer layer will crack relatively early in the life of the golf ball and will create dissatisfaction on the part of golfers using the ball.

Machines and methods have been developed to manufacture golf balls made of multiple components made of different materials. The different materials within a golf ball may provide different properties that address the considerations noted above. However, the machines and methods to make golf balls made of different materials may experience challenges during manufacture.

SUMMARY

A mold and method for manufacturing a compression-molded article is disclosed. The compression-molded article may be a component used to make a golf ball, such as a hemispherical section. The hemispherical section may have a cup shape and may be used to form substantially half of an outer core that encloses an inner core of the golf ball. The mold may include a mold plate and a movable insert. The mold plate may include one or more projections. The projection may be rounded to mold a hemispherical section having a rounded inner surface. The movable insert may be a flat plate that includes one or more apertures corresponding to the one or more projections. The mold may further include an upper mold plate that includes a cavity that receives the projection. The mold may include one or more lugs to provide a space between the mold plate and the upper mold plate when the mold is closed. The mold may include one or more holes to receive the one or more lugs.

The mold may be configured so that when the mold is open the movable insert is at a position at which a surface of the movable insert is proximate to a top portion of the projection. The mold may be configured so that when the mold is open the movable insert is at a position at which a surface of the movable insert is lower than a top portion of the projection. The mold may be configured such that when the mold is closed the upper mold plate contacts the surface of the movable insert and moves the movable insert relative to the projection. The mold may be configured so that when the mold is fully closed the projection extends past the second surface of the movable insert to a greater extent than when the mold is open. The movable insert may be joined to the mold plate by a connection, such as a biasing device or a device powered by a motor. A release coating may be provided on the projection. The mold may be configured to manufacture more than one article with a single closure of the mold, such as two hemispherical sections. A mold plate may include a first projection with a first height and a second projection with a second height. The first height may be greater than the second height. The first height may be greater than the second height by a thickness of a movable plate or movable insert.

In one aspect, a mold for manufacturing hemispherical sections for a golf ball may include a mold plate and a movable insert. The mold plate includes a first surface. The movable insert includes a second surface. The movable insert is connected to the mold plate. The first surface of the mold plate and the second surface of the movable insert may move relative to one another during molding of a hemispherical section for a golf ball.

In another aspect, a mold for manufacturing hemispherical sections for a golf ball includes a first mold plate including a movable insert and a second mold plate. The mold is configured so that when the mold is closed the second mold plate contacts the movable insert and causes the movable insert to move relative to the first mold plate.

In another aspect, a method of making a compression-molded article, the method includes providing a mold plate. The mold plate includes a first mold surface and a second mold surface. The first mold surface is connected to the second mold surface. The first mold surface is configured to move relative to the second mold surface. A second mold plate is provided. The second mold plate includes a third mold surface which corresponds to the second mold surface. A material is positioned between the mold plate and the third mold surface. At least one of the mold plate and the second mold plate is moved towards the other of the mold plate and the second mold plate to compress the material into the compression-molded article.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The embodiments described herein regard a mold and method for manufacturing a compression-molded article is disclosed. The compression-molded article may be a component used to make a golf ball, such as a hemispherical section. The mold may include a mold plate and a movable insert. The mold plate may include one or more projections. The projection may be rounded to mold a hemispherical section having a rounded inner surface. The movable insert may be a flat plate that includes one or more apertures corresponding to the one or more projections. The embodiments advantageously minimize or eliminate movement of molding material from its proper position during a molding process.

First, a discussion will be provided regarding golf ball constructions and before discussing how multi-piece constructions having an inner core and outer core are generally made. Solid golf balls traditionally have multiple layers. While it is possible to use a golf ball that is made of one solid material, such a one-piece ball typically exhibits low-performance because golf balls having multiple layers are typically designed to allow a golfer to strike the ball such that it would fly longer or with greater control than a ball made of one solid material. Each layer of a golf ball is selected to provide one or more key characteristics for the golfer. The present embodiments also include multiple layers.

To provide a golf ball with a range of properties not normally exhibited by a one-piece solid golf ball, golf balls having a multi-piece construction have been developed. The different pieces of a multi-piece golf ball may be made of different materials that perform in different ways. For example, one piece of a multi-piece golf ball may provide a desired compression, while another piece may provide a durable cover. Exemplary embodiments of multi-piece golf balls will now be reviewed.

Figure 1:
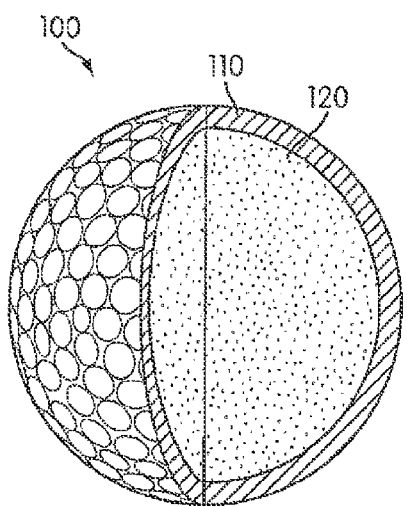
FIG. 1 shows a first representative golf ball in accordance with this disclosure, the golf ball being of a two-piece construction.

FIGS. 1-4 show various embodiments of multi-piece golf balls in accordance with this disclosure. FIG. 1 shows a first golf ball 100 having aspects in accordance with this disclosure. Golf ball 100 is a two-piece golf ball. Specifically, golf ball 100 includes cover layer 110 substantially surrounding core 120. Cover layer 110 may be formed of any golf ball cover material known in the art, which in some embodiments maybe a relatively soft but durable material. For example, cover layer 110 may be formed of a material that compresses/flexes when struck by a golf club, in order to provide spin of the ball and feel to the player. Although relatively soft, the material may also be durable, in order to withstand scuffing from the club and/or the golf course.

FIG. 1 illustrates the outer surface of cover layer 110 as having a generic dimple pattern. While the dimple pattern on golf ball 100 may affect the flight path of golf ball 100, any suitable dimple pattern may be used with the disclosed embodiments. In some embodiments, golf ball 100 may be provided with a dimple pattern including a total number of dimples between approximately 250 and 450.

Figure 2:
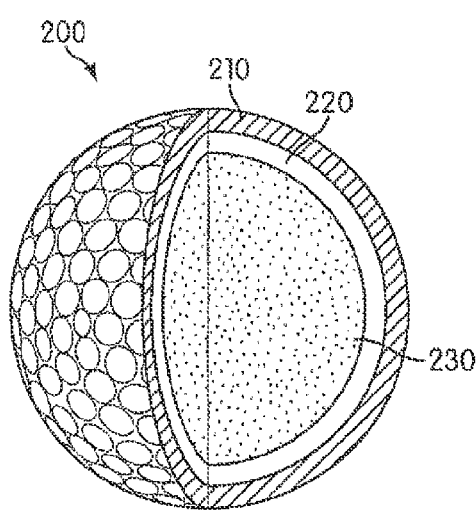
FIG. 2 shows a second representative golf ball, the golf ball having an inner cover layer and an outer cover layer.

FIG. 2 shows a second golf ball 200 having aspects in accordance with this disclosure. Golf ball 200 includes a core 230, an mantle layer 220 substantially surrounding core 230, and an outer cover layer 210 substantially surrounding mantle 220.

Figure 3:
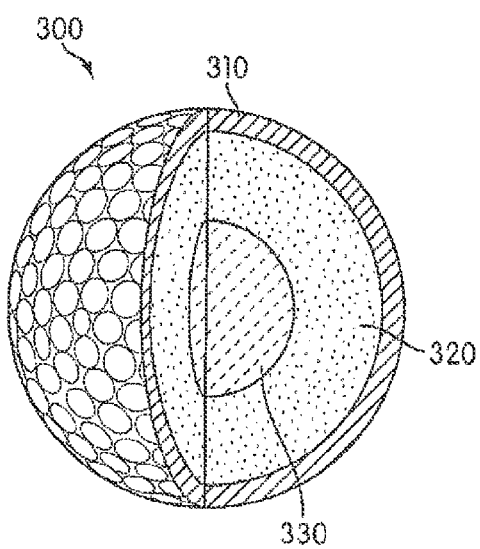
FIG. 3 shows a third representative golf ball, the golf ball having an inner core and an outer core.

FIG. 3 shows a third golf ball 300 having aspects in accordance with this disclosure, where third golf ball 300 has a three-piece construction. Three-piece golf ball 300 includes a first inner core 330, a first outer core 320 substantially surrounding first inner core 330, and a first cover layer 310 substantially surrounding first outer core 320.

Figure 4:
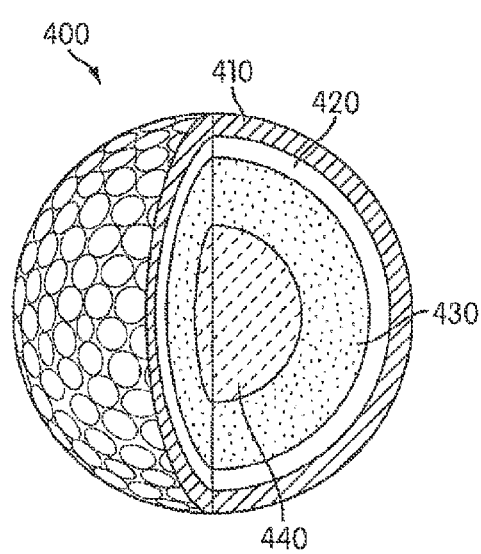
FIG. 4 shows a fourth representative golf ball, the golf ball having an inner core, an outer core, an inner cover layer, and an outer cover layer.

FIG. 4 shows a fourth golf ball 400 having aspects in accordance with this disclosure, where fourth golf ball 400 has a four-piece construction. Golf ball 400 includes a second inner core 440, a second outer core 430 substantially surrounding second inner core 440, an inner cover layer 420 substantially surrounding outer core 430, and an outer cover layer 410 substantially surrounding inner cover layer 420.

Generally, the term "core" as used herein refers to at least one of the innermost structural components of the golf ball. The term core may therefore refer, with reference to FIG. 3 but applicable to any embodiment discussed herein, to (1) first inner core 330 only, (2) both first inner core 330 and first outer core 320 collectively, or (3) first outer core 320 only. The term core may also encompass more than two layers if, for example, an additional structural layer is present between first inner core 330 and first outer core 320 or encompassing first outer core 320.

A core may be formed from thermosetting or thermoplastic materials, such as polyurethane, polyurea, partially or fully neutralized ionomers, thermosetting polydiene rubber, such as polybutadiene, polyisoprene, ethylene propylene diene monomer rubber, ethylene propylene rubber, natural rubber, balata, butyl rubber, halobutyl rubber, styrene butadiene rubber or any styrenic block copolymer, such as styrene ethylene butadiene styrene rubber, etc., metallocene or other single site catalyzed polyolefin, polyurethane copolymers, e.g. with silicone.

In addition to the materials discussed above, compositions for portions of a golf ball, such as the core, cover, or any intermediate layer (a layer between the innermost core and the outermost cover layer) may incorporate one or more polymers. Examples of suitable additional polymers include, but are not limited to, the following: thermoplastic elastomer, thermoset elastomer, synthetic rubber, thermoplastic vulcanizate, copolymeric ionomer, terpolymeric ionomer, polycarbonate, polyolefin, polyamide, copolymeric polyamide, polyesters, polyvinyl alcohols, acrylonitrile-butadiene-styrene copolymers, polyarylate, polyacrylate, polyphenylene ether, impact-modified polyphenylene ether, high impact polystyrene, diallyl phthalate polymer, metallocene catalyzed polymers, styrene-acrylonitrile (SAN) (including olefin-modified SAN and acrylonitrile-styrene-acrylonitrile), styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, and polysiloxane or any metallocene-catalyzed polymers of these species. Suitable polyamides for use as an additional material in compositions within the scope of the present invention also include resins obtained by: (1) polycondensation of (a) a dicarboxylic acid, such as oxalic acid, adipic acid, sebacic acid, terephthalic acid, isophthalic acid or 1,4-cyclohexanedicarboxylic acid, with (b) a diamine, such as ethylenediamine, tetramethylenediamine, pentamethylenediamine, hexamethylenediamine or decamethylenediamine, 1,4-cyclohexyldiamine or m-xylylenediamine; (2) a ring-opening polymerization of cyclic lactam, such as ε-caprolactam or w-laurolactam; (3) polycondensation of an aminocarboxylic acid, such as 6-aminocaproic acid, 9-aminononanoic acid, 11-aminoundecanoic acid or 12-aminododecanoic acid; or (4) copolymerization of a cyclic lactam with a dicarboxylic acid and a diamine. Specific examples of suitable polyamides include Nylon 6, Nylon 66, Nylon 610, Nylon 11, Nylon 12, copolymerized Nylon, Nylon MXD6, and Nylon 46.

Other materials suitable for use as a material in compositions include polyester elastomers marketed under the tradename SKYPEL by SK Chemicals of Republic of Korea, or diblock or triblock copolymers marketed under the tradename SEPTON by Kuraray Corporation of Kurashiki, Japan, and KRATON by Kraton Polymers Group of Companies of Chester, United Kingdom. All of the materials listed above can provide for particular enhancements to ball layers prepared within the scope of the present invention.

Ionomers also are well suited as a golf ball material, by itself or in a blend of compositions. Suitable ionomeric polymers (i.e., copolymer- or terpolymer-type ionomers) include α-olefin/unsaturated carboxylic acid copolymer-type ionomeric or terpolymer-type ionomeric resins. Copolymeric ionomers are obtained by neutralizing at least a portion of the carboxylic groups in a copolymer of an α-olefin and an α,β-unsaturated carboxylic acid having 3 to 8 carbon atoms, with a metal ion. Examples of suitable α-olefins include ethylene, propylene, 1-butene, and 1-hexene. Examples of suitable unsaturated carboxylic acids include acrylic, methacrylic, ethacrylic, α-chloroacrylic, crotonic, maleic, fumaric, and itaconic acid. Copolymeric ionomers include ionomers having varied acid contents and degrees of acid neutralization, neutralized by monovalent or bivalent cations discussed above.

Terpolymeric ionomers are obtained by neutralizing at least a portion of carboxylic groups in a terpolymer of an α-olefin, and an α,β-unsaturated carboxylic acid having 3 to 8 carbon atoms, and an α,β-unsaturated carboxylate having 2 to 22 carbon atoms with metal ion. Examples of suitable α-olefins include ethylene, propylene, 1-butene, and 1-hexene. Examples of suitable unsaturated carboxylic acids include acrylic, methacrylic, ethacrylic, α-chloroacrylic, crotonic, maleic, fumaric, and itaconic acid. Examples of suitable α,β-unsaturated carboxylates include methyl acrylate, ethyl acrylate and n-butyl acrylate. Terpolymeric ionomers include ionomers having varied acid contents and degrees of acid neutralization, neutralized by monovalent or bivalent cations as discussed above. Examples of suitable ionomeric resins include those marketed under the name SURLYN® manufactured by E.I. du Pont de Nemours & Company of Wilmington, Del., and IOTEK® manufactured by Exxon Mobil Corporation of Irving, Tex.

Silicone materials also are well suited for use in golf balls, either alone or as a component in a blend of materials. These can be monomers, oligomers, prepolymers, or polymers, with or without additional reinforcing filler. One type of silicone material that is suitable can incorporate at least 1 alkenyl group having at least 2 carbon atoms in their molecules. Examples of these alkenyl groups include, but are not limited to, vinyl, allyl, butenyl, pentenyl, hexenyl and decenyl. The alkenyl functionality can be located at any location of the silicone structure, including one or both terminals of the structure. The remaining (i.e., non-alkenyl) silicon-bonded organic groups in this component are independently selected from hydrocarbon or halogenated hydrocarbon groups that contain no aliphatic unsaturation. Non-limiting examples of these include: alkyl groups, such as methyl, ethyl, propyl, butyl, pentyl and hexyl; cycloalkyl groups, such as cyclohexyl and cycloheptyl; aryl groups, such as phenyl, tolyl and xylyl; aralkyl groups, such as benzyl and phenethyl, and halogenated alkyl groups, such as 3,3,3-trifluoropropyl and chloromethyl. Another type of silicone material suitable for use in the present invention is one having hydrocarbon groups that lack aliphatic unsaturation. Specific examples of suitable silicones for use in making compositions of the present invention include the following: trimethylsiloxy-endblocked dimethylsiloxane-methylhexenylsiloxane copolymers; dimethylhexenlylsiloxy-endblocked dimethylsiloxane-methylhexenylsiloxane copolymers; trimethylsiloxy-endblocked dimethylsiloxane-methylvinylsiloxane copolymers; trimethylsiloxy-endblocked methylphenylsiloxane-dimethylsiloxane-methylvinylsiloxane copolymers; dimethylvinylsiloxy-endblocked dimethylpolysiloxanes; dimethylvinylsiloxy-endblocked dimethylsiloxane-methylvinylsiloxane copolymers; dimethylvinylsiloxy-endblocked methylphenylpolysiloxanes; dimethylvinylsiloxy-endblocked methylphenylsiloxane-dimethylsiloxane-methylvinylsiloxane copolymers; and the copolymers listed above, in which at least one end group is dimethylhydroxysiloxy. Commercially available silicones suitable for use in compositions within the scope of the present invention include Silastic by Dow Corning Corp. of Midland, Mich., Blensil by GE Silicones of Waterford, N.Y., and Elastosil by Wacker Silicones of Adrian, Mich.

Other types of copolymers also can be added to compositions within the scope of the present invention. Examples of copolymers comprising epoxy monomers and which are suitable for use within the scope of the present invention include styrene-butadiene-styrene block copolymers, in which the polybutadiene block contains an epoxy group, and styrene-isoprene-styrene block copolymers, in which the polyisoprene block contains epoxy. Commercially available examples of these epoxy functional copolymers include ESBS A1005, ESBS A1010, ESBS A1020, ESBS AT018, and ESBS AT019, marketed by Daicel Chemical Industries, Ltd. of Osaka, Japan.

Next, a general discussion will be provided of how golf balls having an inner core and an outer core are made. Golf balls that include cores formed by multiple pieces, such as first inner core 330 and first outer core 320 of golf ball 300 and second inner core 440 and second outer core 430 of golf ball 400, may be formed by a multi-step process. For example, first outer core 320 and second outer core 430 may be first formed as separately molded sections that are subsequently molded about first inner core 330 and second inner core 440, respectively, to form first outer core 320 about first inner core 330 and to form second outer core 430 about second inner core 440. When made of thermoset materials, such as butadiene rubber (BR), such molded sections may be produced in the form of hemispherical sections or cups which are configured to encase a previously molded inner core when the hemispherical sections are molded about the inner core, causing to the hemispherical sections to join together to form the outer core. Subsequently, the molded combination of outer core and inner core may be further processed to manufacture a golf ball, such as, for example, by grinding off any molding flash, tumbling the outer core/inner core combination to roughen its outer surface, and to apply further materials, such as the materials for a mantle and/or a cover.

Figure 5A:
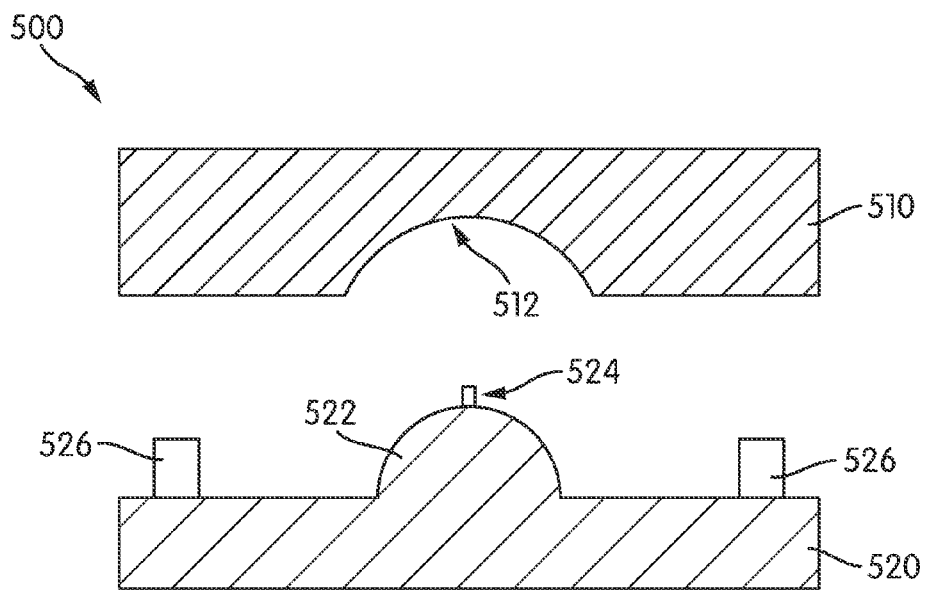
FIG. 5A is a side cross-sectional view of a conventional mold for molding an outer core half, the mold shown in an initial, open position.

FIG. 5A depicts a side sectional view of a conventional mold 500 for producing a hemispherical section of an outer core. Such a hemispherical section may be matched with a corresponding hemispherical section. The two hemispherical sections may be subsequently molded together to produce an outer core, such as outer core 320 of golf ball 300 or outer core 430 of golf ball 400, for example. Another part or parts may be positioned between the hemispherical portions as well prior to being molded together. Mold 500 may include an upper mold plate 510 and a lower mold plate 520 for compression molding a material. Lower mold plate 520 may include a projection 522 while upper mold plate 510 may include a cavity 512 that is sized and shaped to receive projection 522. Projection 522 has a shape corresponding to an inner surface of a hemispherical section where an inner core would be located. In such embodiments, projection 522 may be provided as a rounded projection. Cavity 512 has a shape corresponding to an outer surface of the hemispherical section. Lower mold plate 520 may include lugs 526 or other devices that provide a gap between upper mold plate 510 and lower mold plate 520 when mold 500 is closed. As will be recognized by those of ordinary skill in the art, lugs 526 may instead be located on upper mold plate 510 or on both upper mold plate 510 and lower mold plate 520.

Figure 5B:
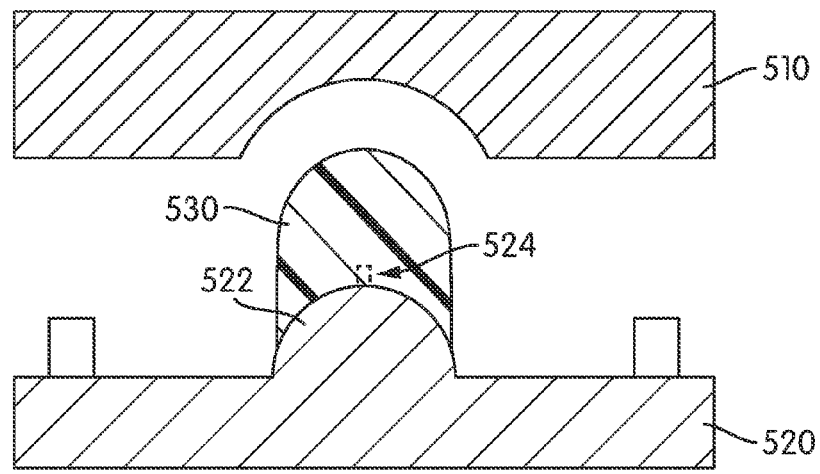
FIG. 5B is a side cross-sectional view of a conventional mold for molding an outer core half after a slug has been introduced, the mold shown in an open position with the mold material positioned within the mold.

As shown in the example of FIG. 5B, a slug 530 is placed within mold 500, between projection 522 and cavity 512, which may serve as a material to be molded. Slug 530 may be a material suitable for molding a hemispherical section subsequently to mold an outer core, such as a thermoset material or any of the other materials discussed above. Slug 530 may have a shape suitable for use in mold 500, such as a dome shape, cylindrical shape, or other suitable shape. A surface of slug 530 facing projection 522 may be concave with a shape corresponding to projection 522, as shown in FIG. 5B. In another example, the surface of slug 530 facing projection 522 may be flat, or may have other shapes used in the art. The surface of slug 530 facing projection 522 may be shaped to assist with positioning slug 530 on projection 522. For example, the surface of slug 530 facing projection 522 may have a concave shape, as shown in FIG. 5B.

To assist in maintaining the position of the slug 530 within mold 500, projection 522 may include a mechanical fastening device 524 to attach slug 530 to projection 522 to a degree. For instance, mechanical fastening device 524 may be a pin that penetrates the material of slug 530, as shown in FIG. 5B, although other fastening devices may be used. The length of mechanical fastening device 524 may be from 0.5 mm to 5 mm, or from 0.5 mm to 3 mm.

Figure 5C:
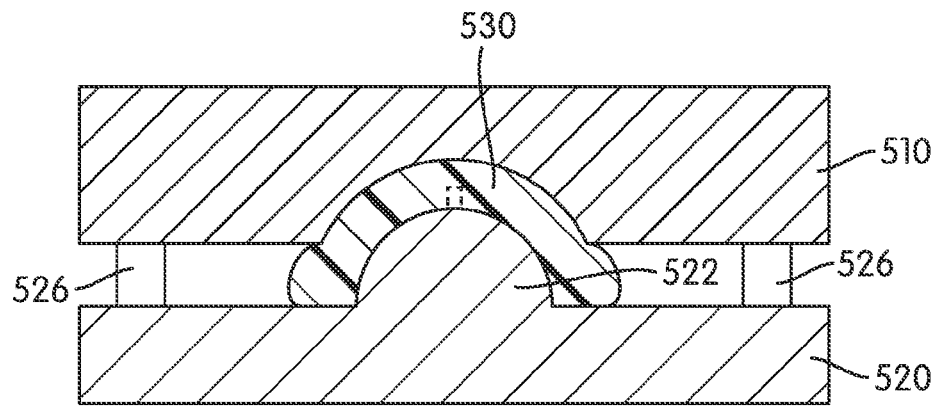
FIG. 5C is a side cross-sectional view of a conventional old for molding an outer core half with the mold in a closed position.

Once slug 530 has been placed within mold 500, mold 500 is closed so that upper mold plate 510 and lower mold plate 520 are brought together, as shown in FIG. 5C. Upper mold plate 510 and lower mold plate 520 may move along guide rods, be hinged, or actuated by other devices (not shown) enabling at least one of upper mold plate 510 and lower mold plate 520 to move relative to the other to close mold 500. Closing mold 500 and pressing upper mold plate 510 against lower mold plate 520 with a pressure ranging between about 85 kg/cm$^2$ and about 170 kg/cm$^2$ causes slug 530 to be deformed between upper mold plate 510 and lower mold plate 520, particularly on the outer surface of projection 522 and within cavity 512, although slug 530 may bulge outward to a degree within a gap provided between upper mold plate 510 and lower mold plate 520. According to an embodiment, at least one of upper mold plate 510 and lower mold plate 520 may be heated to assist with curing of slug 530.

Figure 14A:
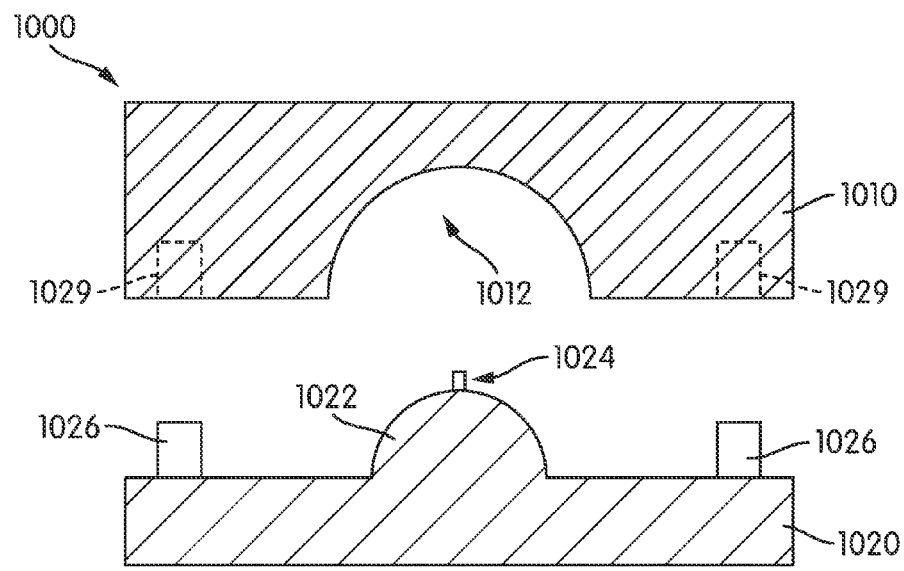
FIG. 14A is a side cross-sectional view of an embodiment of a conventional mold for molding an outer core half, the mold shown in an initial, open position.

According to an embodiment, a mold may include one or more alignment pins and one or more holes corresponding to the alignment pins. The alignment pins may assist with alignment of mold plates during a molding process. Such alignment pins may be provided in a mold instead of lugs 526. Turning to FIG. 14A, an example of a mold 1000 for producing a hemispherical section of an outer core is shown. Mold 1000 may include an upper mold plate 1010 and a lower mold plate 1020 for compression molding a material. Lower mold plate 1020 may include a projection 1022 while upper mold plate 1010 may include a cavity 1012 that is sized and shaped to receive projection 1022. Lower mold plate 1020 may include one or more alignment pins 1026 or other devices that mate with upper mold plate 1010 to assist with alignment between upper mold plate 1010 and lower mold plate 1020. For example, upper mold plate 1010 may include one or more alignment holes 1029 that correspond to the one or more alignment pins 1026 of lower mold plate 1020. Such alignment pins 1026 and alignment holes 1029 may assist in providing projection 1022 and cavity 1012 in a concentric or coaxial alignment when mold 1000 is dosed. As will be recognized by those of ordinary skill in the art, alignment pins 1026 may instead be located on upper mold plate 1010 and alignment holes 1029 may be provided on lower mold plate 1020, or alignment pins 1026 and alignment holes 1029 may be provided on both upper mold plate 1010 and lower mold plate 1020.

Figure 14B:
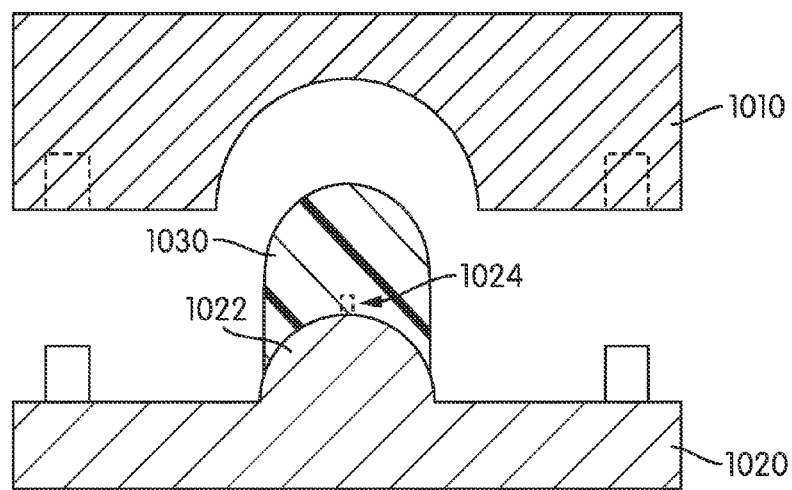
FIG. 14B is a side cross-sectional view of a conventional mold for molding an outer core half after a slug has been introduced, the mold shown in an open position with the mold material positioned within the mold.
Figure 14C:
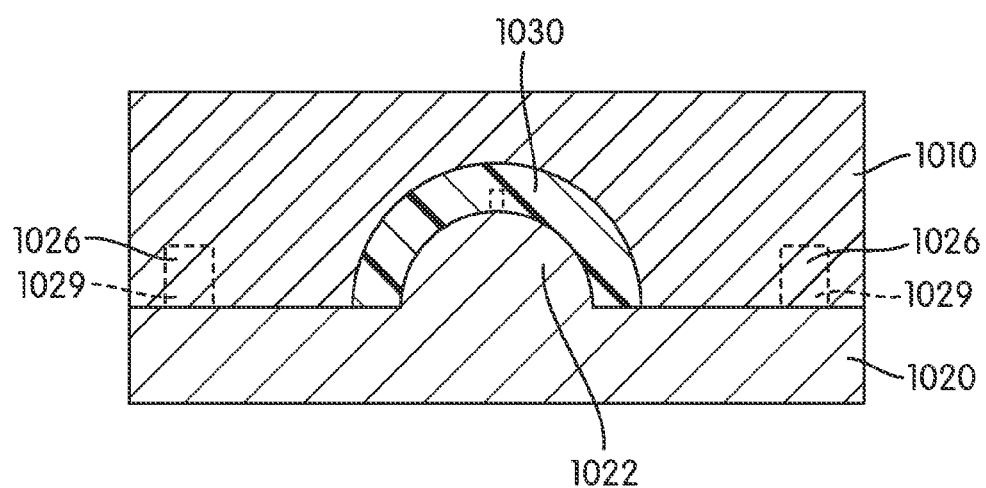
FIG. 14C is a side cross-sectional view of a conventional mold for molding an outer core half with the mold in a closed position.

As shown in the example of FIG. 14B, a slug 1030 is placed within mold 1000, between projection 1022 and cavity 1012, which may serve as a material to be molded. Once slug 1030 has been placed within mold 1000, mold 1000 is dosed, as discussed above in regard to mold 500 in FIG. 5C, so that upper mold plate 1010 and lower mold plate 1020 are brought together, as shown in FIG. 14C.

Due to the shape of the surfaces of cavity 512 and projection 522 of mold 500 in FIG. 5C, slug 530 is deformed into a particular shape, such as a hemispherical section 632. Similarly, the shape of cavity 1012 and projection 1022 of mold 1000 in FIG. 14C may deform slug 1030 into a particular shape, such as a hemispherical section 632. Such a hemispherical section 632 may have a cup-like shape. Hemispherical section 632 may, for example, form substantially half of an outer core, such as first outer core 320 and second outer core 430, above, that is subsequently molded from two hemispherical sections 632.

Figure 5D:
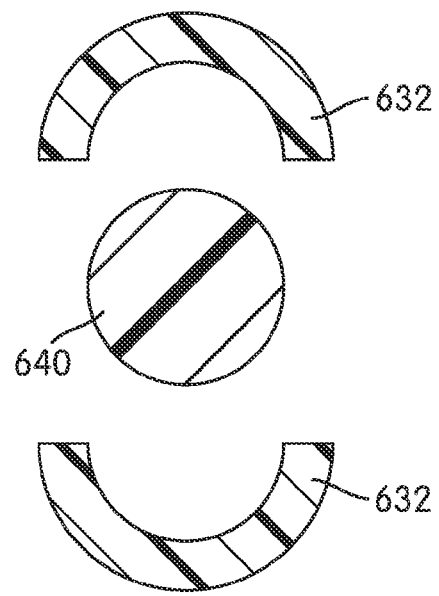
FIG. 5D is a side cross-sectional view of an embodiment of a core with an inner core and two outer core halves.
Figure 5E:
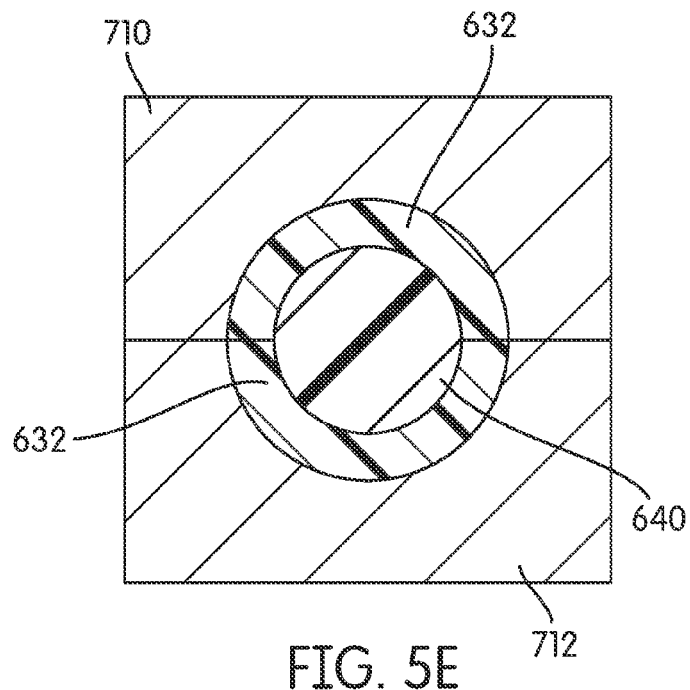
FIG. 5E is a side cross-sectional view of an embodiment of a mold to mold outer core halves and an inner core together.

A second hemispherical section 632 is molded and, as shown in FIG. 5D, hemispherical sections 632 are arranged to encase a previously molded inner core 640. Hemispherical sections 632 and inner core 640 are then placed between an upper mold 710 and a lower mold 712, as shown in FIG. 5E, with inner core 640 placed between hemispherical sections 632. Upper mold 710 and lower mold 712 are subsequently pressed together to join hemispherical sections 632 to form a completed core, which has an outer core that encases inner core 640, such as outer core 320 of golf ball 300 shown in FIG. 3 or outer core 430 of golf ball 400 shown in FIG. 4.

An important consideration when molding hemispherical sections 632 in the process shown in FIGS. 5A-5C is that a slug 530 is properly located and centered within mold 500 during the molding operation. If slug 530 is not properly located within mold 500 during the molding operation, a hemispherical section 632 may be produced that has an unsatisfactory shape.

Figure 6A:
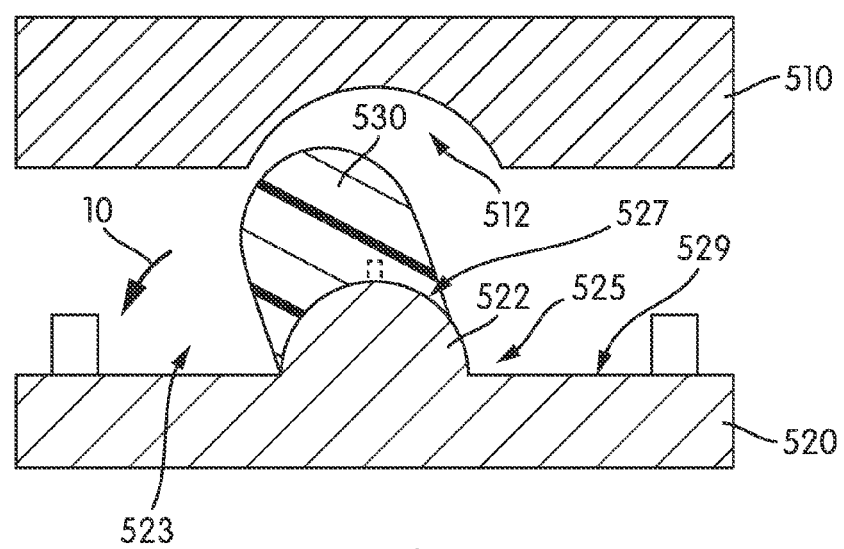
FIG. 6A is a side cross-sectional view of a conventional process for molding an outer core half in which a slug has fallen out of proper position.
Figure 6B:
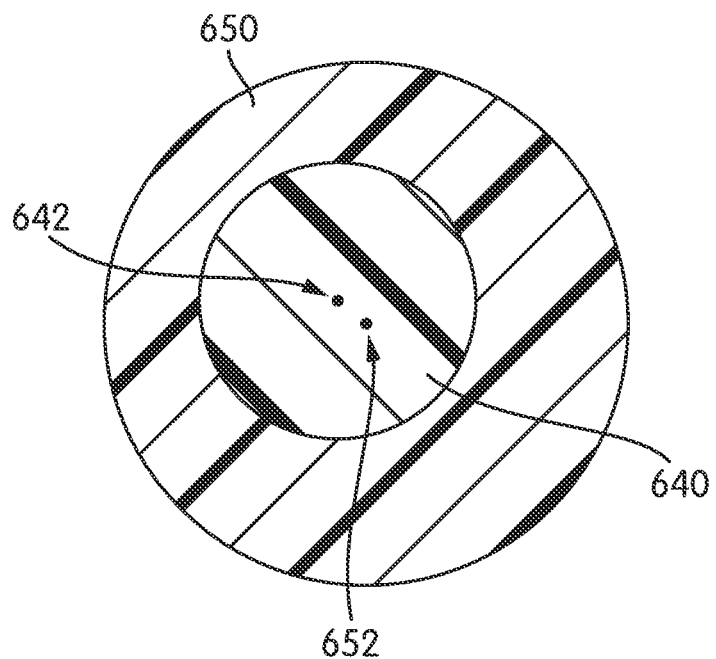
FIG. 6B is a side cross-sectional view of a core that includes an inner core and an outer core.

For instance, a slug 530 placed on top of projection 522 may move relative to projection 522 and cavity 512 before molding is complete. As shown in FIG. 6A, slug 530 may move in direction 10, such as by slipping off of an upper portion 527 of projection 522. Such a movement may result in the formation of a hemispherical section (not shown) having an undesirable shape because more of slug 530 may be located on a first side 523 of projection 522 than on a second side 525 of projection 522 after slug has been pressed between upper mold plate 510 and lower mold plate 520. As a result, the molded hemispherical section 632 may be thicker on one side than another, which will cause an inner core to be off-center within the golf ball. For example, as shown in FIG. 6B, an inner core 640 may be offset within an outer core 650 after a molding operation. For instance, the center 642 of inner core 640 may be offset from a center 652 of outer core 650. Center 652 may also be the center of a golf ball that includes inner core 640 and outer core 650. Such an off-center inner core would likely provide less than optimal results for a golf ball. For example, the flight performance in USDA symmetry test may not be satisfactory.

The embodiments discussed herein advantageously address this issue by providing a machine and method that minimizes or eliminates movement of molding material from its proper position during a molding process. One way to address this issue is to reduce the distance between the upper portion 527 of projection 522 and a surface 529 of lower mold plate 520.

Figure 7:
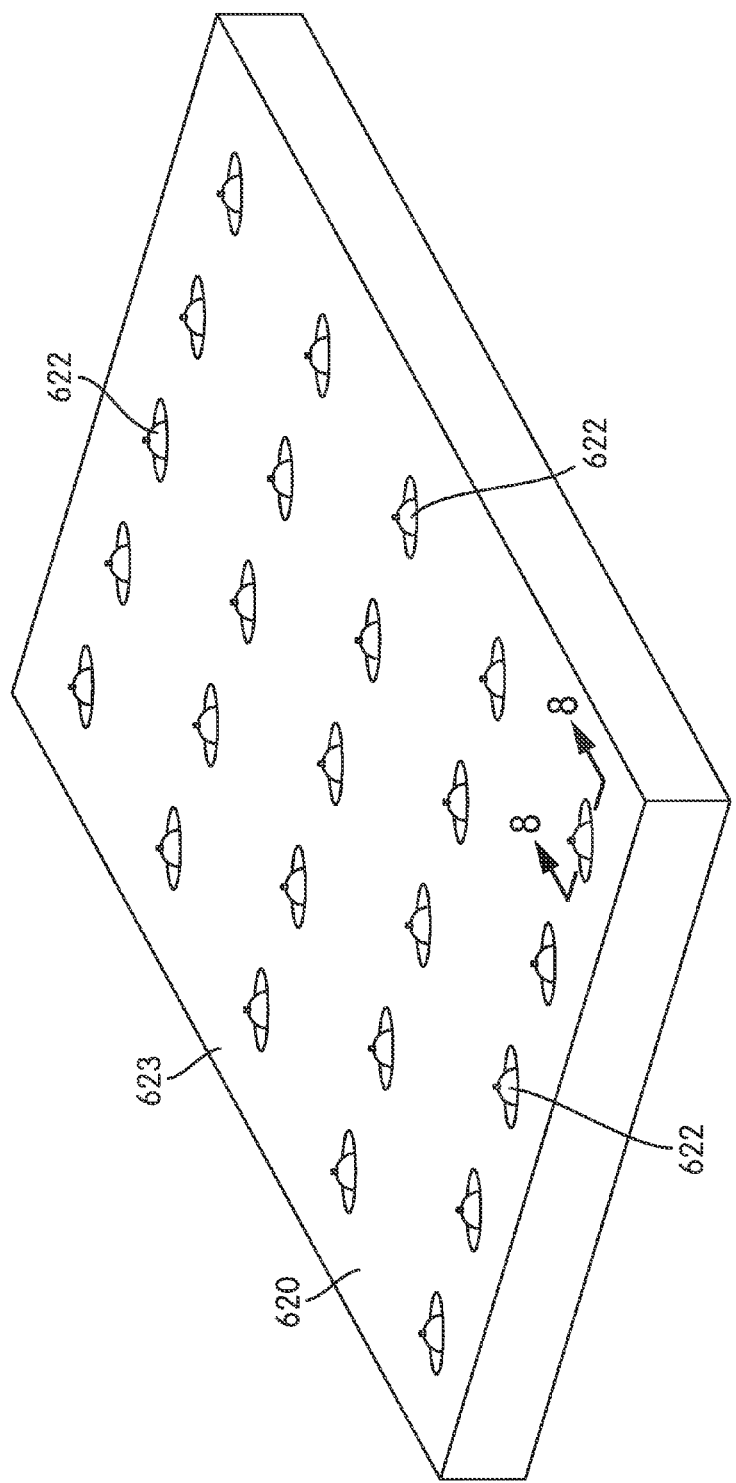
FIG. 7 is a perspective view of an embodiment of a molding plate.
Figure 8:
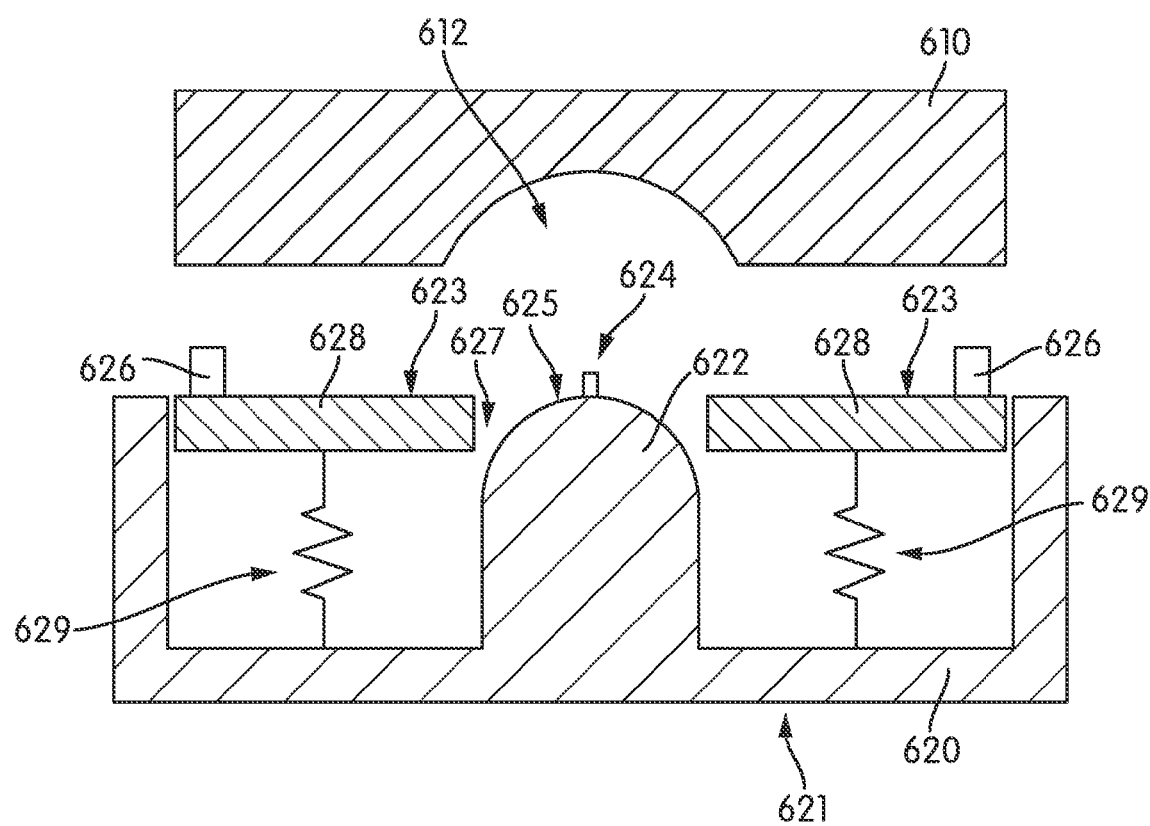
FIG. 8 is a side cross-sectional view taken along line 8-8 in FIG. 7 of an embodiment of a single mold cavity for molding an outer core half, where the cavity is in an initial open and empty configuration.

Turning to FIG. 7, an embodiment of a molding plate 620 for molding hemispherical sections is shown. Molding plate 620 has an upper surface 623 and a plurality of projections 622 protruding through upper surface 623. Projections 622 and upper surface 623 are configured to move relative to one another. Turning to FIG. 8, a cross-sectional view of one of the projections 622 of molding plate 620 is shown, along with an upper mold plate 610 having one or more cavities 612. Each pair of cavities 612 and projections 622 may form a complete mold cavity. Cavities 612 of upper mold plate 610 correspond to projections 622 so that projections 622 are inserted into cavities 612 when upper mold plate 610 and mold plate 620 are brought together during a molding operation.

Mold plate 620 includes a movable insert 628. Movable insert 628 may be in the form of a flat plate that includes an aperture 627 through which projection 622 extends. As a result, movable insert 628 surrounds projection 622, such as in a plane, when projection 622 extends through the aperture of movable insert 628. When upper mold plate 610 and mold plate 620 are separated so that upper mold plate 610 and movable insert 628 are not in contact, as shown in FIG. 8, movable insert 628 may be located proximate to an upper surface 625 of projection 622. In another example, projection 622 may extend above movable insert 628 by a predetermined amount. For instance, upper surface 625 of projection 622 may extend above movable insert 628 by approximately 0.5 mm to 7 mm. In another example, upper surface 625 of projection 622 may extend above movable insert 628 by approximately 1 mm to 5 mm. In another example, upper surface 625 of projection 622 may extend above movable insert 628 by approximately 1 mm to 3 mm. It may not be desirable for upper surface 625 of projection 622 to extend above movable insert 628 by more than 7 mm because a slug may slip off of projection 522 and produce an off-centered core.

Movable insert 628 may be joined to mold plate 620 via one or more biasing devices 629. Biasing devices 629 may be, for example, a spring, that biases movable insert 628 away from a lower surface 612 of mold plate 620 towards upper mold plate 610. Helical springs, coil springs, compression springs and other types of springs known in the art may be used. The spring constant of springs used for biasing movable insert 628 may be considered in view of the weight of movable insert 628. In one example, when the weight of movable insert 628 is about 71 kg, four springs (outer diameter of 40 mm) with a spring constant of 7.2 Kgf/mm and four springs (outer diameter of 30 mm) with a spring constant of 2.2 Kgf/mm may be used. The material of a spring is not limited, as long as the material is suitable for use with the embodiments described in this disclosure. In one embodiment, the material of a spring is oil tempered SiCr-alloyed valve spring wire (SWOSC-V). When biasing device 629 is a spring, lugs 626 may serve as anchors for the spring to assist with attaching biasing device 629 to movable insert 628. In this regard, lugs 626 may provide this anchoring function in addition to their spacing function between upper mold plate 510 and lower mold plate 520 or alternatively to their spacing function.

In another example, biasing devices 629 may be an actuated connection. For example, biasing devices 629 may be motorized and powered by a motor that causes movable insert 628 to move relative to mold plate 620. In other examples, biasing devices 629 may be pneumatic, hydraulic, or powered by other means known in the art. Movable insert 628 may also include one or more lugs 626 or other devices that provide a gap between upper mold plate 610 and mold plate 620 when they are closed together, although lugs 626 may instead be located on upper mold plate 610 or on both upper mold plate 610 and mold plate 620.

Figure 9:
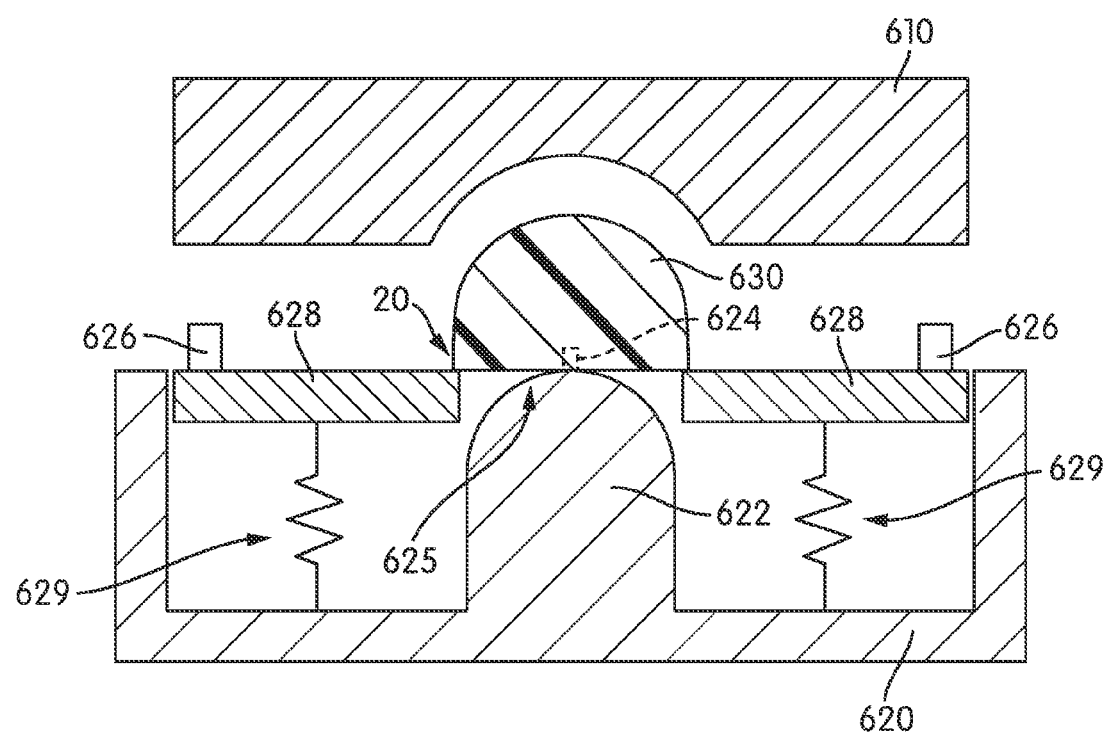
FIG. 9 is a side cross-sectional view of an embodiment of a single mold cavity for molding an outer core half after a slug has been introduced.

As shown in the example of FIG. 9, a slug 630 may be inserted between upper mold plate 610 and mold plate 620. In particular, slug 630 may be located on an upper surface 625 of projection 622. A lower surface of slug 630 facing movable insert 628 may contact an upper surface of movable insert 628 that faces upper mold plate 610, as shown in FIG. 9. Such an arrangement may advantageously minimize or avoid slipping of slug 630 off of projection 622. Further, projection 622 may include a mechanical fastening device 624, as discussed above, to assist in maintaining the location and positioning of slug 630.

Because movable insert 628 is located proximate to upper surface 625 of projection 622 when upper mold plate 610 and mold plate 620 are separated from one another, movable insert 628 is also located proximate to slug 630. For example, slug 630 may already contact movable insert 628, or move into contact with movable insert 628, to essentially provide a support for slug 630 or a stop for unintended motion of slug 630. As a result, movable insert 628 does not permit slug 630 to move by a substantial amount during a molding process and advantageously addresses the issue of slugs movable during a molding process and producing unsatisfactory hemispherical sections.

When upper mold plate 610 and lugs 626 are not in contact so that movable insert 628 is fully extended, movable insert 628 may be positioned at a first position, such as a first upper position, that provides a gap 20 between movable insert 628 and slug 630. Gap 20 may have a size such that slug 630 may move by an amount that does not substantially affect the molded shape of a hemispherical section, and the eventual centering of an inner core within the hemispherical section, slug 630 comes into contact with movable inset 628 and ceases to move. In another example, movable insert 628 may be at a second position, such as a second upper position lower than the first upper position, at which movable insert 628 is in contact with slug 630. In such an second example, slug 630 may be substantially prevented from lateral and/or rotational movement relative to projection 622.

Figure 10:
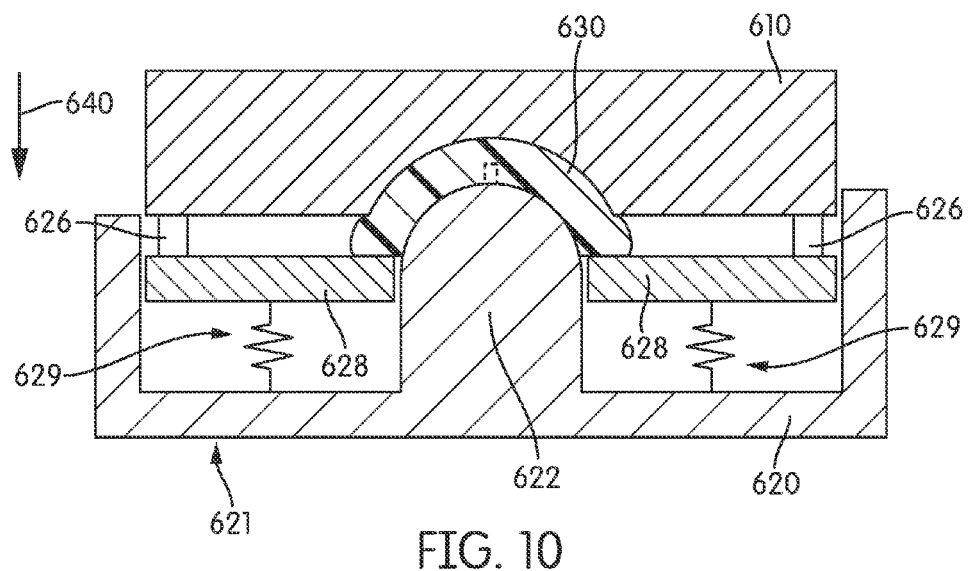
FIG. 10 is a side cross-sectional view of an embodiment of a single mold cavity for molding an outer core half after the mold has been partially closed around the slug, so that a first portion of an embodiment of the mold plate has moved relative to a second portion of the mold plate.

After slug 630 has been placed between upper mold plate 610 and mold plate 620, such as by an operator, upper mold plate 610 and mold plate 620 may be brought together to commence a compression molding operation to mold slug 630 into a hemispherical section. During the molding operation, mold plate 620 and movable insert 628 may move relative to one another. For example, as shown in FIG. 10, when upper mold plate 610 and mold plate 620 are dosed together, upper mold plate 610 may come into contact (directly with one another or indirect via lugs 626) with, and press against, movable insert 628, causing movable insert 628 to be depressed downwards in direction 640 towards lower surface 621 of mold plate 620. In such an example, lower surface 621 of mold plate 620 may serve as a first surface and surface 623, which is formed by movable insert 628, may serve as a second surface, with the first surface and second surface moving relative to one another during a molding operation. In the case that upper mold plate 610 directly contacts movable insert 628 (such as when lugs 626 are not present), a gap may be formed between upper mold plate 610 and movable insert 628, within which slug 630 may be deformed and molded into a hemispherical section. Such movement may cause movable insert 628 to withdraw within mold plate 620 or move relative to projection 622. This movement of movable insert 628 relative to mold plate 620 may overcome the resistance of biasing devices 629, when biasing devices 629 are energy storage-type devices, such as springs, or biasing devices 629 may be driven downwards according to the downward motion of movable insert 628 when biasing devices 629 are actuated devices such as pneumatically-, hydraulically- or motor-driven pistons.

Figure 11:
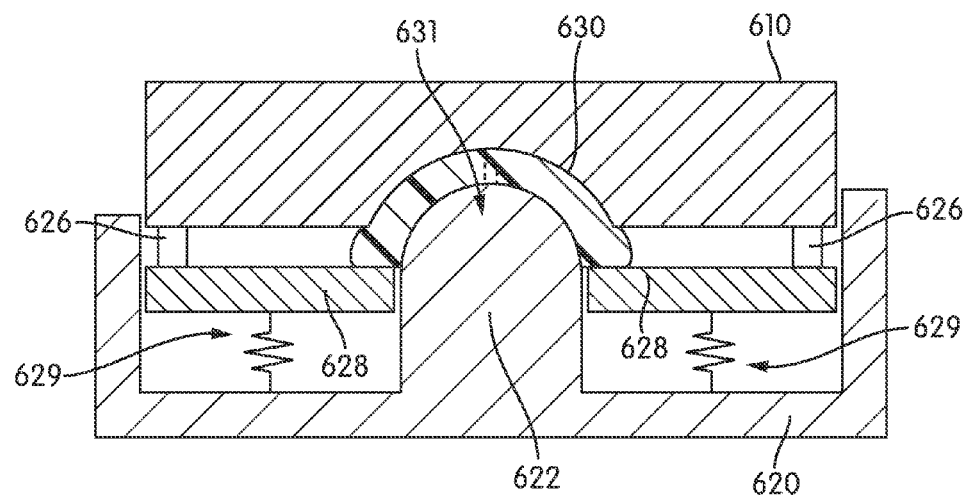
FIG. 11 is a side cross-sectional view of an embodiment of a single mold cavity for molding an outer core half after the mold has been fully closed and the first portion of the mold plate has moved to a final position relative to the second portion of the mold plate.

Turning to FIG. 11, upper mold plate 610 and mold plate 620 are completely closed together with a pre-selected applied pressure to complete the compression molding of slug 630 into a hemispherical section. The applied pressure may be, for example, a pressure ranging between about 85 kg/cm$^2$ and about 170 kg/cm$^2$. In this position, movable insert 628 has been pushed into an interior space within mold plate 620 so that slug 630 may be molded around projection 622. As movable insert 628 is pushed into the interior space of mold plate 620, movable insert 628 may come into contact with mold plate 620. The resultant hemispherical section has a recess 631 generally in the shape of projection 622 that is configured to receive an inner core. In other words, movable insert 628 is initially at a position to minimize or prevent movement of slug 630 that would render a molded hemispherical section unsatisfactory but the initial position is not conducive for forming the cup-like shape and recess 631 of a hemispherical section. As a result, movable plate 628 is driven into the interior space within mold plate 620 when upper mold plate 610 and mold plate 620 are brought together during a molding operation. This movement of movable insert 628 permits slug 630 to be deformed around projection 622 so that slug 630 may be molded into a hemispherical section having a recess 631 suitable for receiving an inner core.

Once the molding process is complete and slug 630 is molded into a hemispherical section, such as hemispherical section 632 shown in FIG. 5D, a second hemispherical section is molded and the two hemispherical sections are joined together to form a completed core with an outer core about the inner core, as shown in FIG. 5E. The resulting core combination may then be processed in the manner discussed above to produce a golf ball.

Other configurations and examples may be employed for the embodiment discussed above. For example, movable insert 628 may be provided as a single plate that surrounds all projections 622 shown in FIG. 7 so that movable insert 628 moves relative to all projections 622 simultaneously. In another example, discrete groups of projections 622 may be surrounded with a movable insert 628, with mold plate 620 including a plurality of movable inserts 628 for multiple groups of projections 622. In another example, each projection 622 may be individually provided with a movable insert 628 that independently moves relative to other movable inserts 622.

As shown in FIG. 7, mold plate 620 may include a plurality of projections 622. According to another example, a molding plate 620 may be provided with a single projection 622 and a single movable insert 628 surrounding the projection 622.

Figure 12:
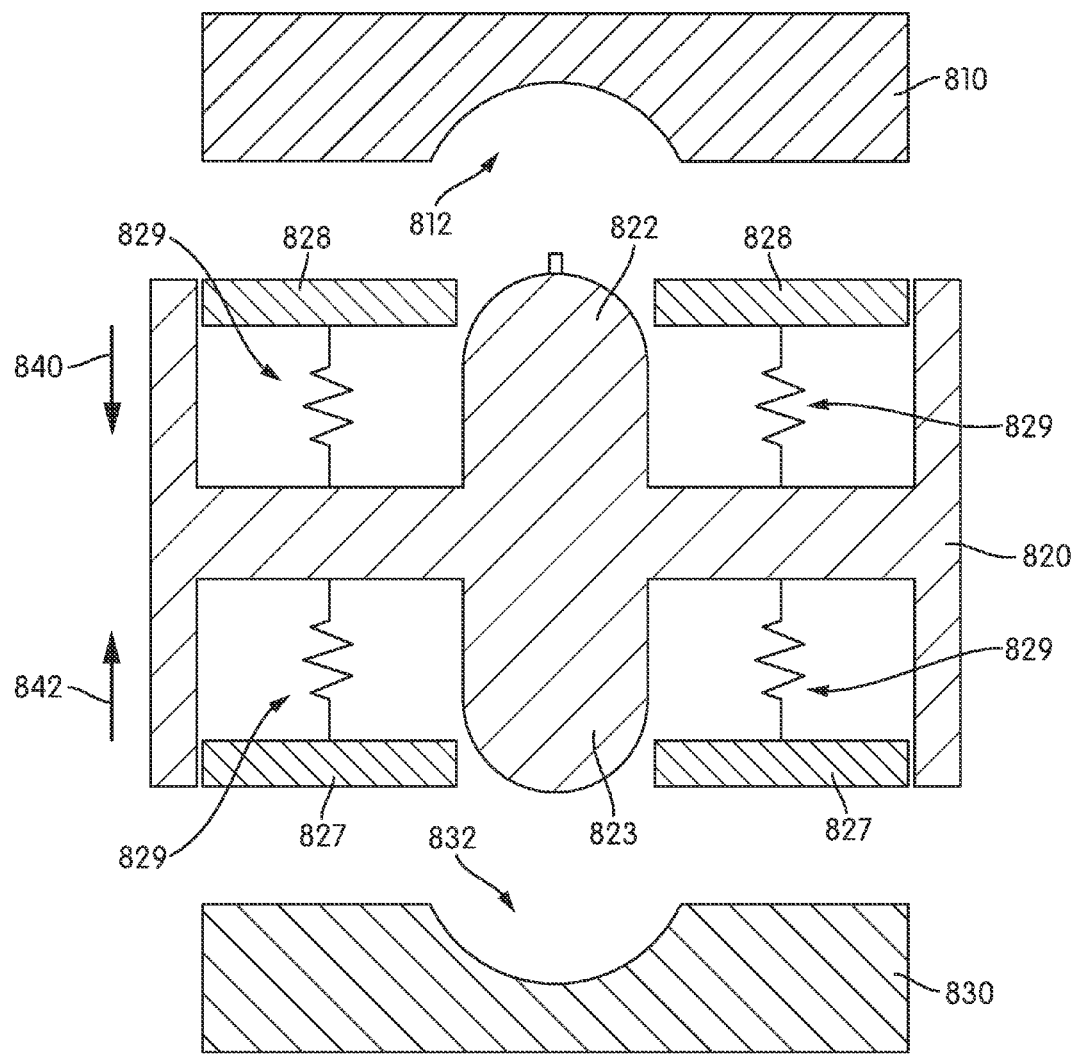
FIG. 12 is a side cross-sectional view of an embodiment of a single mold cavity for molding outer core halves.

According to another configuration, a mold may manufacture corresponding sets of hemispherical sections. As shown in FIG. 12, a mold 800 may include an upper mold plate 810 with a cavity 812, a lower mold plate 830 with a cavity 832, and a midplate 820. Midplate 820 may include a first projection 822 and a second projection 823 that are each respectively surrounded by a first movable insert 828 and a second movable insert 827, through which the projections 822, 823 extend. Movable inserts 828, 827 may be joined to midplate 820 by biasing devices 829, as discussed above. A slug (not shown in FIG. 12) may then be placed upon first projection 822 opposite cavity 812 and a slug may be placed within cavity 832. The slug may contact movable insert 828, similarly to slug 630 in FIG. 9. During a molding operation, upper mold plate 810 may be actuated to move in direction 840 and contact the first movable insert 828 opposite to upper mold plate 810, causing the first movable insert 828 to move relative to midplate 820 as a slug is molded within a space provided between the first projection 822 and cavity 812. Conversely, lower mold plate 830 may move in direction 842 and contact the second movable insert 827 opposite to lower mold plate 830, causing the second movable insert 827 to move upward as a slug is molded within a space provided between the second projection 823 and cavity 832. Hemispherical sections produced by mold 800 may subsequently be placed around an inner core within a mold to form an outer core/inner core combination, as described in the example of FIG. 5E.

In another example, after hemispherical sections have been produced, molded hemispherical sections are kept in cavity 812 and cavity 832, respectively. Midplate 820 may be removed from mold 800 and an inner core (not shown) may be placed within at least one top a hemispherical section in cavity 812 and a hemispherical section in cavity 832 to form an outer core/inner core combination. Such a process is described in U.S. patent Publication No. 20130140734, currently U.S. Ser. No. 13/311,415, titled "Method For Compression Molding A Dual Core For A Golf Ball", and filed Dec. 5, 2011, in the name of Chien-Hsin Chou et al., which is hereby incorporated by reference in its entirety.

During compression molding operations, molded material, such as the material of the slugs, may accumulate on the surfaces and walls of a mold. Further, even though a mold may have relatively tight tolerances and relatively small gaps between surfaces, molded material may also be pressed into the small gaps between surfaces. Such accumulation of mold material in undesired locations may affect the precision of the mold process and may even hinder or jam the movement of mold components.

Figure 13:
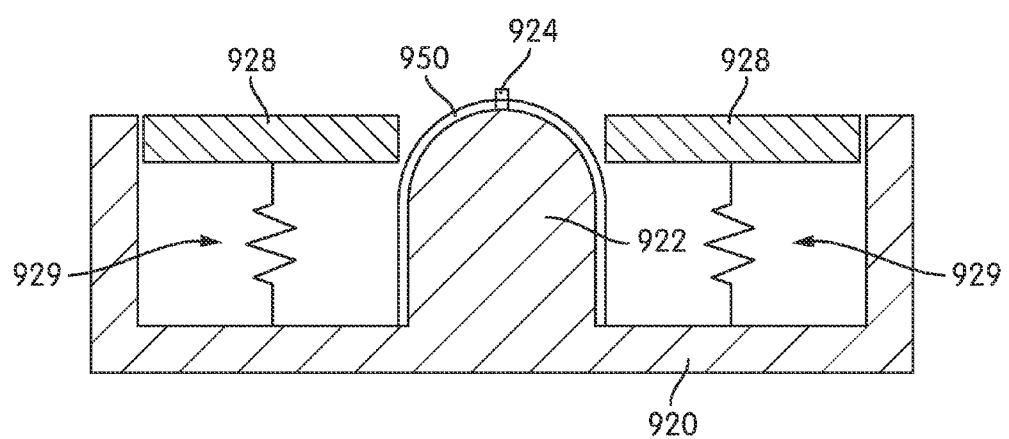
FIG. 13 is a side cross-sectional view of an embodiment of a portion of a mold for molding an outer core half.

According to one embodiment, a projection of a mold plate may include a coating to facilitate the release of a molded hemispherical section from a projection. As shown in the example of FIG. 13, a mold plate 910 may include a projection, a movable insert 928 joined to mold plate 920 by one or more biasing devices 929, as described above. A release coating 950, such as Teflon®, EFTE, or blue fluoropolymer film, may be provided on projection 922, and/or movable insert 928, and/or on walls of mold plate 920 to facilitate the release of a molded hemispherical section from projection 922. Coating 950 may also minimize accumulation of molded material, such as material from slugs, that otherwise might accumulated in the space between projection 922 and movable insert 928, which could lead to jamming of the movable insert 928 as the material from the slugs cures. Coating 950 may be made from a material with a low coefficient of friction. Projection 922 may also include a mechanical fastening device 924, as discussed above, which may extend through and above coating 950 so that mechanical connecting device 924 is at least partially uncoated by coating 950, Mechanical fastening device 924 may be fully coated by coating 950. In one embodiment, mechanical fastening device 924 may extend through and above coating 950 so that mechanical fastening device 924 is at least partially uncoated by coating 950.

Figure 15:
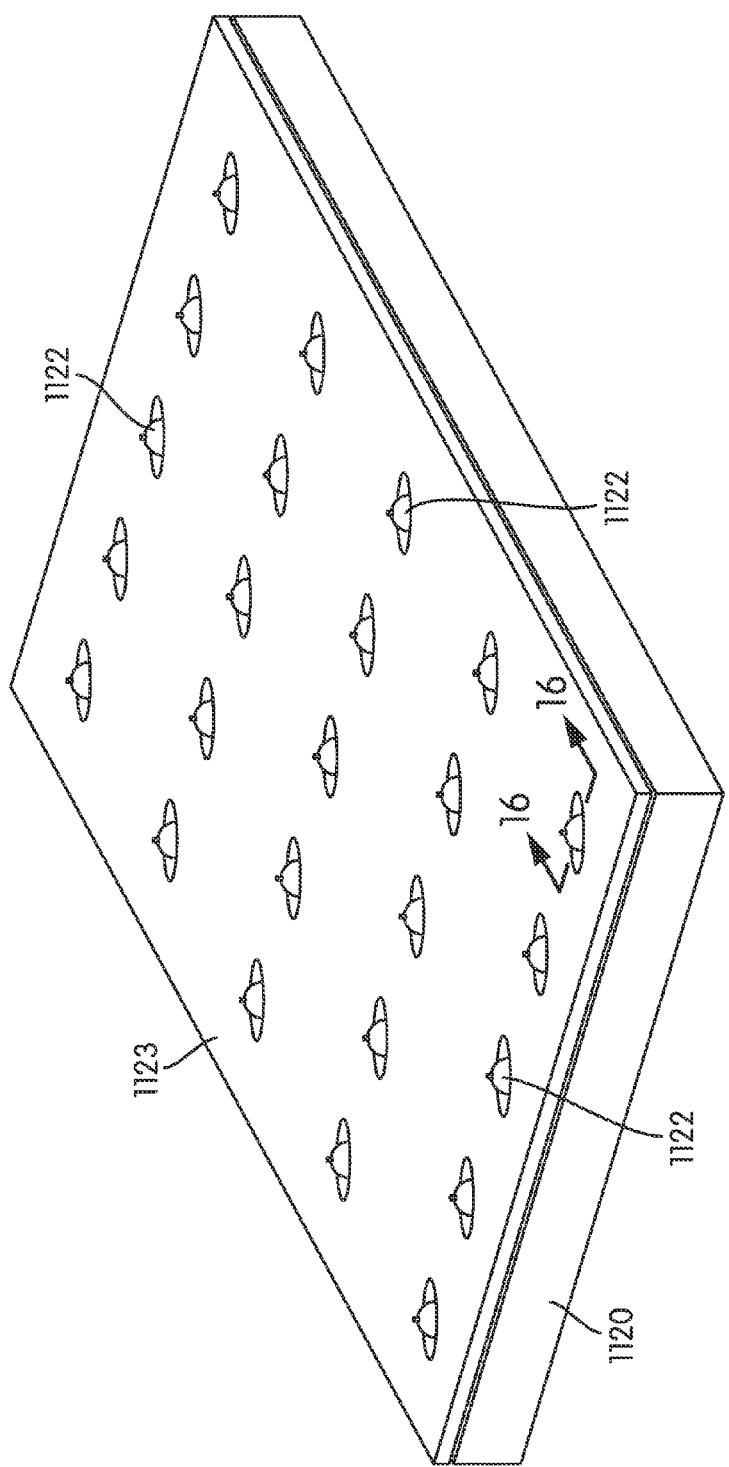
FIG. 15 is a perspective view of an embodiment of a molding plate.

Turning to FIG. 15, an embodiment of a molding plate for molding hemispherical sections is shown. Molding plate may be provided as a lower mold plate 1120 that includes one or more projections 1122 that protrude through an upper surface 1123 of lower mold plate 1120, as shown in FIG. 15.

Figure 16:
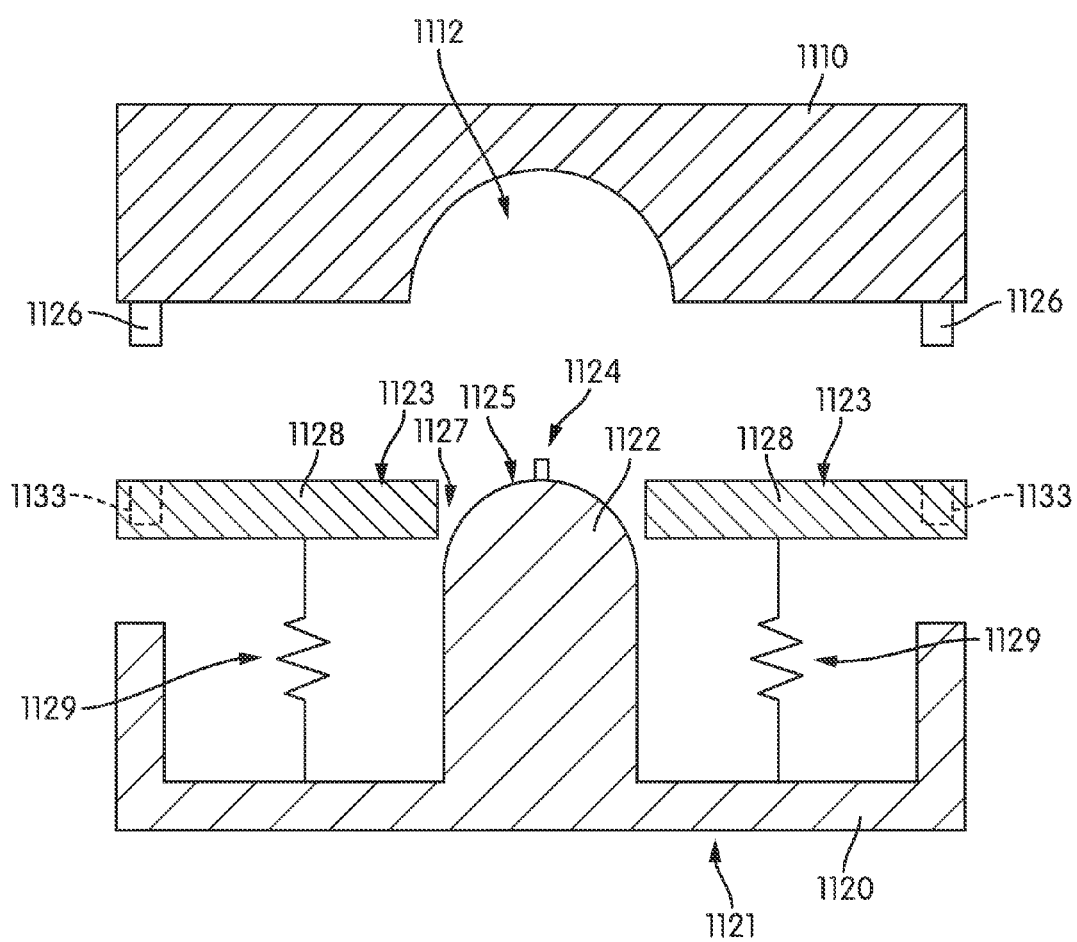
FIG. 16 is a side cross-sectional view taken along line 17-17 in FIG. 7 of an embodiment of a single mold cavity for molding an outer core half, where the cavity is in an initial open and empty configuration.

Turning to FIG. 16, a cross-sectional view of one of the projections 1122 of molding plate 1120 is shown, along with an upper mold plate 1110 having one or more cavities 1112 corresponding to projections 1122. Each pair of cavities 1112 and projections 1122 may form a complete mold cavity. Lower mold plate 1120 may include a movable plate 1128. Movable plate 1128 may form top surface 1123 of lower mold plate 1120. Movable plate 1128 may be in the form of a flat plate that includes an aperture 1127 through which projection 1122 extends. As a result, movable plate 1128 may surround projection 1122, such as in a plane, when projection 1122 extends through the aperture of movable plate 1128. Further, in the example of FIGS. 16 and 17, movable plate 1128 may be provide as a plate that extends to the edges of lower mold plate 1120, instead of being provided as an insert that fits within a recess of lower mold plate 1120, as shown in the example of FIGS. 7 and 8.

When upper mold plate 1110 and lower mold plate 1120 are separated so that upper mold plate 1110 and movable plate 1128 are not in contact, as shown in FIG. 16, movable plate 1128 may be located proximate to an upper surface 1125 of projection 1122. In another example, projection 1122 may extend above movable plate 1128 by a predetermined amount, such as by extending above upper surface 1123. For instance, upper surface 1125 of projection 1122 may extend above movable plate 1128 by approximately 0.5 mm to 7 mm. In another example, upper surface 1125 of projection 1122 may extend above movable plate 1128 by approximately 1 mm to 5 mm. In another example, upper surface 1125 of projection 1122 may extend above movable plate 1128 by approximately 1 mm to 3 mm. In some embodiments, upper surface 1125 of projection 1122 may desirably extend above movable plate 1128 by no more than 7 mm, because a slug may slip off of projection 1122 and produce an off-centered core.

Movable plate 1128 may be joined to lower mold plate 1120 via one or more biasing devices 1129. As discussed above, biasing devices 1129 may be, for example, a spring, that biases movable plate 1128 away from a lower surface 1121 of lower mold plate 1120 towards upper mold plate 1110. In another example, biasing devices 1129 may be an actuated connection, as discussed above. For instance, biasing devices 1129 may be actuated devices, such as pneumatically-, hydraulically- or motor-driven pistons.

According to an embodiment, upper mold plate 1110 and lower mold plate 1120 may include alignment pins and one or more holes corresponding to the alignment pins. The alignment pins may assist with alignment of mold plates during a molding process. For example, upper mold plate 1110 may include one or more alignment pins 1126 or other devices that mate with lower mold plate 1120 to assist with alignment between upper mold plate 1110 and lower mold plate 1120. For instance, movable plate 1128 may include one or more alignment holes 1133 that correspond to the one or more alignment pins 1126 of upper mold plate 1110. Such alignment pins 1126 and alignment holes 1133 may assist in providing projection 1122 and cavity 1112 in a concentric or coaxial alignment when the mold is closed. As will be recognized by those of ordinary skill in the art, alignment pins 1126 may instead be located on movable plate 1128 and alignment holes 1133 may be provided on upper mold plate 1110, or alignment pins 1126 and alignment holes 1133 may be provided on both upper mold plate 1110 and lower mold plate 1120. In another example, alignment pins 1126 may be provided on movable plate 1128 to serve as anchors for biasing device 1129 to assist with attaching biasing device 1129 to movable plate 1128.

Figure 17:
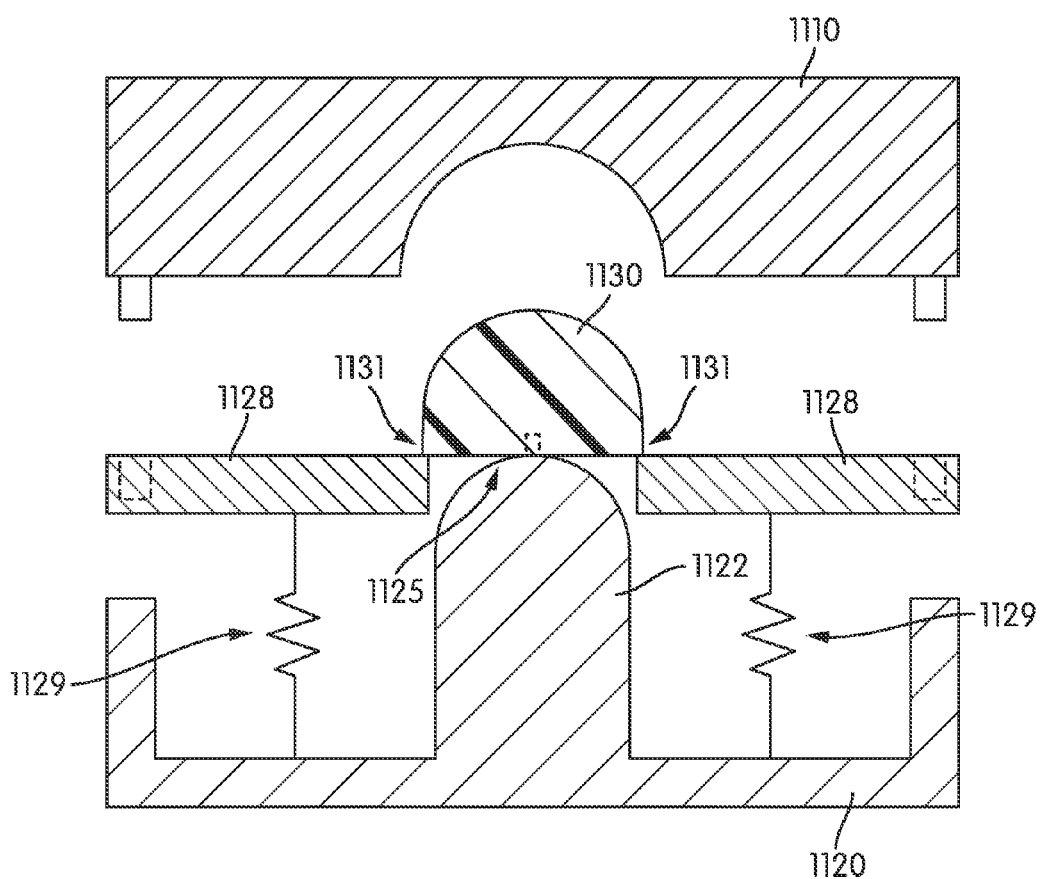
FIG. 17 is a side cross-sectional view of an embodiment of a single mold cavity for molding an outer core half after a slug has been introduced.

As shown in the example of FIG. 17, a slug 1130 may be inserted between upper mold plate 1110 and lower mold plate 1120. In particular, slug 1130 may be located on an upper surface 1125 of projection 1122. A lower surface of slug 1130 facing movable plate 1128 may contact an upper surface 1123 of movable plate 1128 that faces upper mold plate 1110. For instance, lateral portions 1131 of slug 1130 may contact movable plate 1128, as shown in FIG. 17. Such an arrangement may advantageously minimize or avoid slipping of slug 1130 off of projection 1122. Projection 1122 may include a mechanical fastening device 1124, as discussed above, to assist in maintaining the location and positioning of slug 1130.

Figure 18:
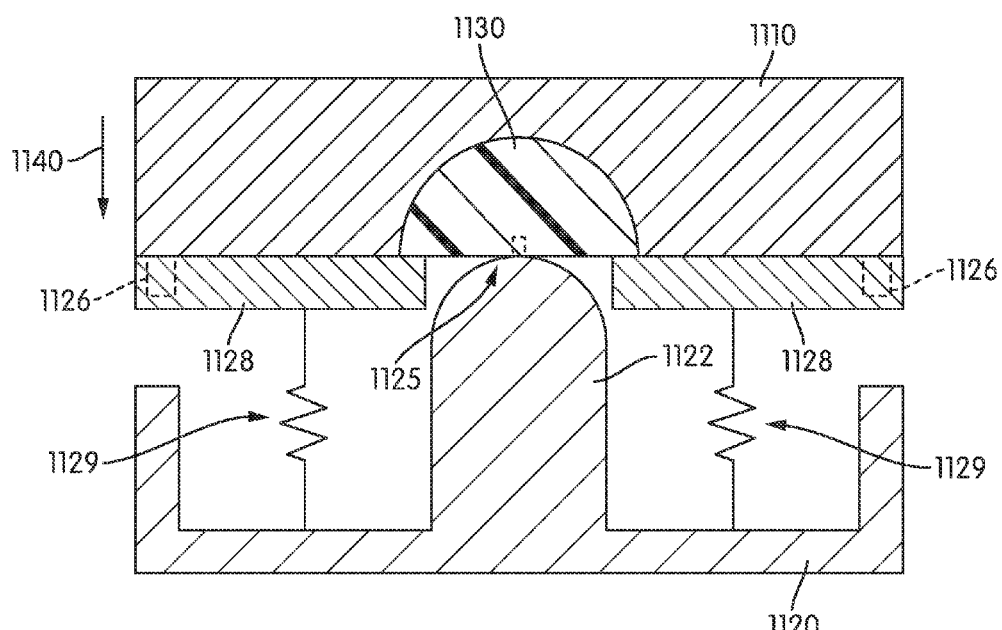
FIG. 18 is a side cross-sectional view of an embodiment of a single mold cavity for molding an outer core half after the mold has been partially closed around the slug, so that a first portion of an embodiment of the mold plate has moved relative to a second portion of the mold plate.

After slug 1130 has been placed between upper mold plate 1110 and lower mold plate 1120, such as by an operator, upper mold plate 1110 and lower mold plate 1120 may be brought together to commence a compression molding operation to mold slug 1130 into a hemispherical section. During the molding operation, lower mold plate 1120 and movable plate 1128 may move relative to one another. For example, as shown in FIG. 18, when upper mold plate 1110 and lower mold plate 1120 are closed together, upper mold plate 1110 may come into contact with, and press against, movable plate 1128, causing movable plate 1128 to be depressed downwards in direction 1140 towards lower surface 1121 of lower mold plate 1120. Alignment pins 1126 are inserted within alignments holes 1133 when upper mold plate 1110 and movable plate 1128 come into contact. In such an example, lower surface 1121 of lower mold plate 1120 may serve as a first surface and surface 1123, which is formed by movable plate 1128, may serve as a second surface, with the first surface and second surface moving relative to one another during a molding operation. This movement of movable plate 1128 relative to lower mold plate 1120 may overcome the resistance of biasing devices 1129, when biasing devices 1129 are energy storage-type devices, such as springs, or biasing devices 1129 may be driven downwards according to the downward motion of movable plate 1128.

Figure 19:
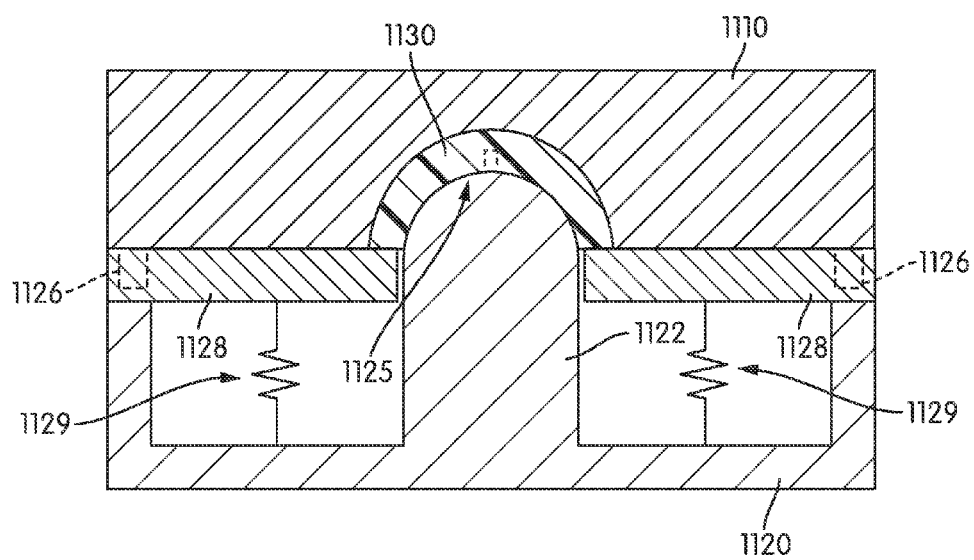
FIG. 19 is a side cross-sectional view of an embodiment of a single mold cavity for molding an outer core half after the mold has been fully closed and the first portion of the mold plate has moved to a final position relative to the second portion of the mold plate.

Turning to FIG. 19, upper mold plate 1110 and lower mold plate 1120 are completely closed together with a pre-selected applied pressure to complete the compression molding of slug 1130 into a hemispherical section. The applied pressure may be, for example, a pressure ranging between about 85 kg/cm² and about 170 kg/cm². In this position, movable plate 1128 has been pushed against lower mold plate 1120, as shown in FIG. 19. This movement of movable plate 1128 permits slug 1130 to be deformed around projection 1122 so that slug 1130 may be molded into a hemispherical section having a recess suitable for receiving an inner core.

Once the molding process is complete and slug 1130 is molded into a hemispherical section, such as hemispherical section 632 shown in FIG. 5D, a second hemispherical section is molded and the two hemispherical sections are joined together to form a completed core with an outer core about the inner core, as shown in FIG. 5E. The resulting core combination may then be processed in the manner discussed above to produce a golf ball.

Figure 20:
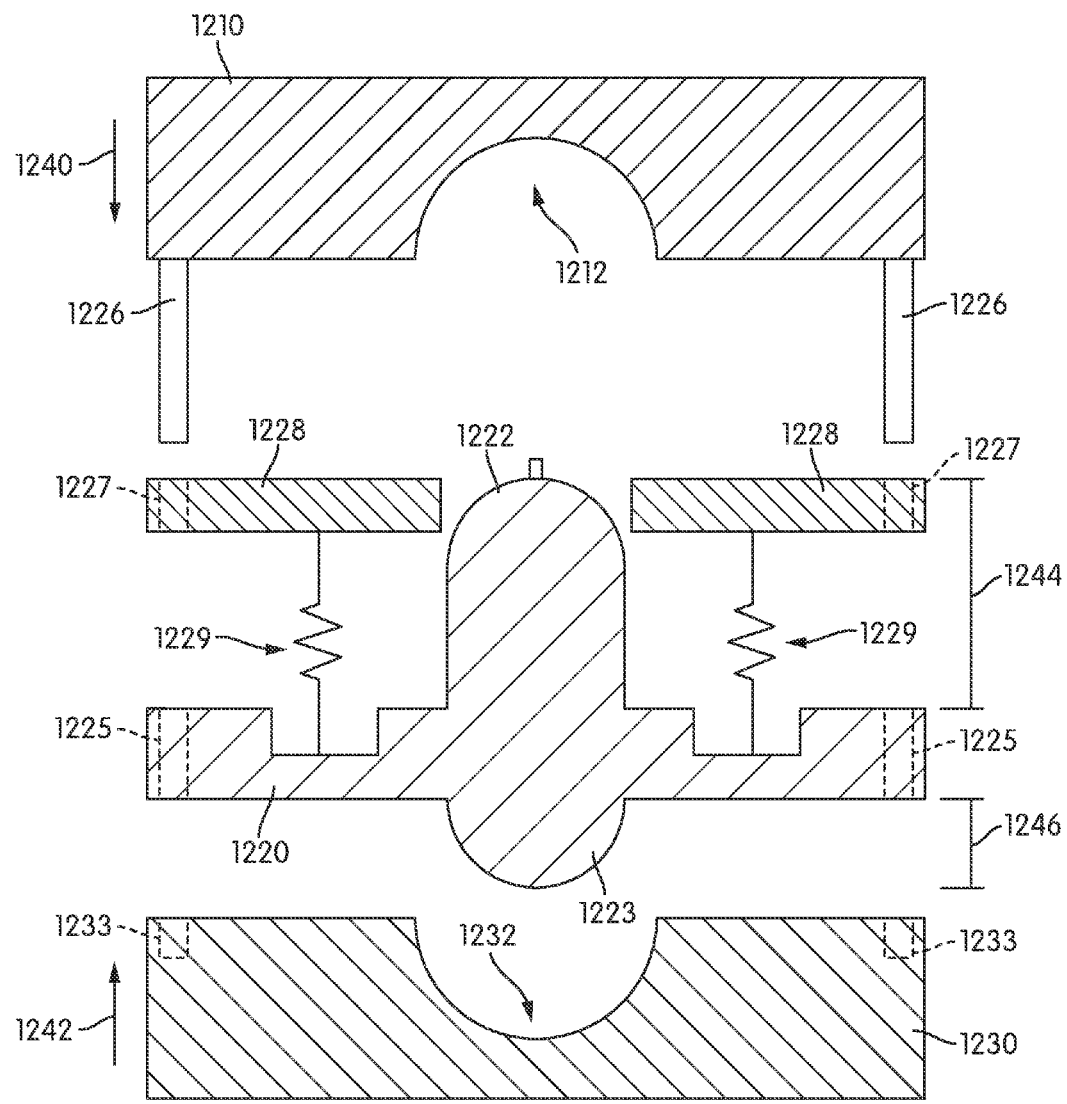
FIG. 20 is a side cross-sectional view of an embodiment of a single mold cavity for molding outer core halves.

Turning to FIG. 20, an embodiment of a mold is shown that includes an upper mold plate 120 with a first cavity 1212, a lower mold plate 1230 with a second cavity 1232, and a midplate 1220 that includes a movable plate 1228 connecting to midplate 1220 with one or more biasing devices 1229. Upper mold plate 1210 may include one or more alignment pins 1226. Movable plate 1228 may include one or more alignment holes 1227, midplate 1220 may include one or more alignment holes 1225, and lower mold plate 1230 may include one or more alignment holes 1233 to receive alignment pins 1226 when the mold is closed, although the alignment pins 1226 may instead be located on other components of the mold, such as lower mold plate 1230.

Midplate 1220 may include a first projection 1222 and a second projection 1223. First projection 1222 may have a first height 1244 and second projection 1223 may have a second height 1246. First height 1244 of first projection 1222 may be greater than second height 1246 of second projection 1223. For instance, because first projection 1222 extends through movable plate 1228 and the thickness of movable plate 1228, first height 1244 may be greater than second height 1246.

According to an embodiment, first height 1244 of first projection 1222 may be greater than second height 1246 of second projection 1223 by the thickness of movable plate 1228. When the mold is closed, such as by moving upper mold plate 1210 in direction 1240 and moving lower mold plate 1230 in direction 1242 shown in FIG. 20, upper mold plate 1210 may contact movable plate 1228 and depress movable plate 1228 towards midplate 1220 until movable plate 1228 contacts midplate 1220. Lower mold plate 1230 may contact midplate 1220 when mold is closed. However, although lower mold plate 1230 may directly contact midplate 1220, upper mold plate 1210 may be separate from midplate 1220 by the thickness of movable plate 1228. When it is desired to produce hemispherical sections in first cavity 1212 and second cavity 1232 that have substantially the same size and shape, it may be desirable for first height 1244 of first projection 1222 to be greater than second height 1246 of second projection 1223 by the thickness of movable plate 1228. Such an arrangement in when first height 1244 is greater than second height 1246 by only the thickness of movable plate 1228 may provide hemispherical sections that are substantially the same, which in turn may assist in forming a dual-core and a golf ball having the dual-core that have a desired performance and quality.

Figure 21:
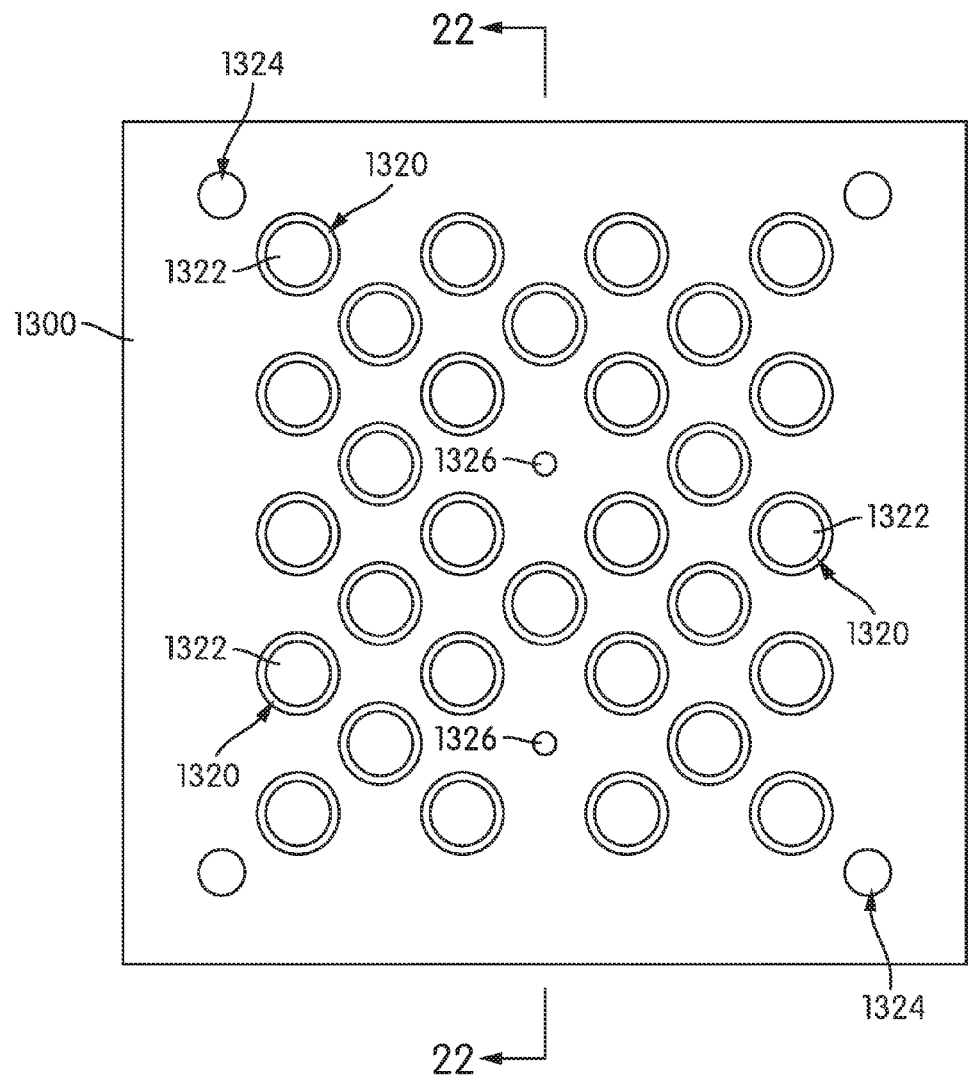
FIG. 21 is a top view of an embodiment of a molding plate.
Figure 22:
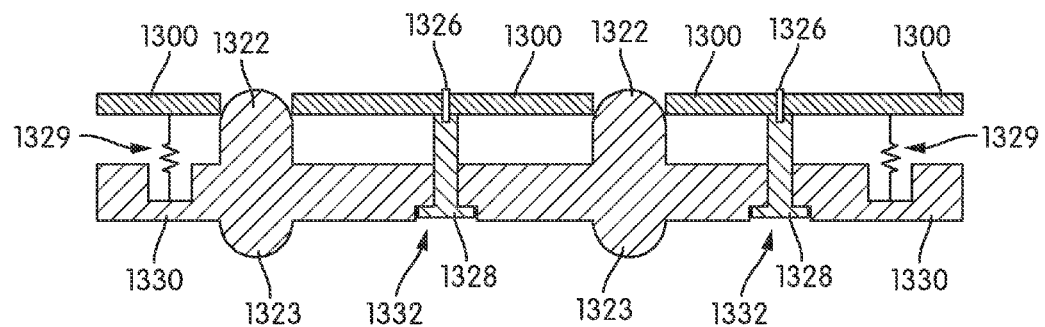
FIG. 22 is a side cross-sectional view taken along line 23-23 in FIG. 22 of an embodiment of a molding plate, where a middle plate is in a fully extended position.

Turning to FIG. 21, a top view of a movable plate 1300 is shown. Movable plate 1300 may be used similarly to the movable plate 1228 of FIG. 20. Movable plate 1300 may include one or more apertures 1320 through which one or more first projections 1320 extend. Movable plate 1300 may also include one or more alignment holes 1324 to receive alignment pins of a mold plate (not shown). Turning to FIG. 22, which is a side cross-sectional view along line 23-23 in FIG. 21, movable plate 1300 may be part of a midplate 1330 that includes the one or more first projections 1322 as well as one or more second projections 1323. Movable plate 1300 may be connected to midplate 1330 by one or more biasing devices 1329 that bias movable plate 1300 upwards in a direction away from midplate 1330. Movable plate 1300 may be further connected to midplate 1330 by one or more pins 1328. Pins 1328 may fit within recesses 1332 provided in midplate 1330 and may have an enlarged head that extends in one or more lateral directions, as shown in FIG. 22. For example, pins 1328 may have heads substantially formed in the shape of a "T," as shown in FIG. 22.

Therefore, when a biasing device 1329 urges movable plate 1300 upwards away from midplate 1330, the head of a pin 1328 may engage with a surface of a recess 1332 to control and limit the distance the biasing device 1329 urges movable plate 1300 upwards away from midplate 1330. In turn, pin 1328 may be used to control the distance between the upper surface of movable plate 1300 and the top surface of a projection 1322 and affect the stability of a slug (not shown) placed upon the top surface of projection 1322. Pins 1328 may be connected to movable plate 1300 by, for example, fasteners 1326, such as screws, bolts, or other fasteners used in the art. In another example, pins 1328 may be formed with movable plate 1300 using a single-piece construction.

Figure 23:
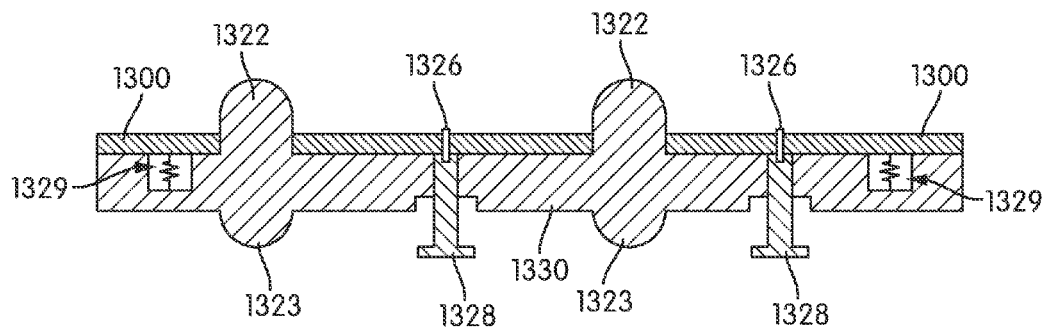
FIG. 23 is a side cross-sectional view taken along line 23-23 in FIG. 22 of an embodiment of a molding plate, where the middle plate is in a depressed position.

When a mold including midplate 1330 is closed, a mold plate may come into contact with movable plate 1300 and force movable plate 1300 in a direction towards midplate 1330. As shown in FIG. 23, movable plate 1300 may be forced into contact with midplate 1330. When this occurs, pins 1328 may also be forced downwards to extend out of recesses 1332. Once a molding operation is complete, the mold may be opened, which releases the pressure upon movable plate 1300 and permits biasing devices 1329 to move movable plate 1300 in a direction away from midplate 1330, such as to the position shown in FIG. 22.

Example

Golf cores were fabricated as described below. Inner cores were made from a HPF 2000 and HPF AD 1035 blend (HPF and HPF AD 1035 are trade names of ionomeric resins by E. I. DuPont de Nemours and Co.) and outer cores were made from a rubber compound of TAIPOL™ BR 150 (TAIPOL™ BR 150 is a trade name of a rubber produced by Taiwan Synthetic Rubber Corporation). Inner cores were made by injection molding, although compression molding could also be applied. The temperature of the injection molding machine was set in a range of 190° C. to 220° C. Outer cores were made by compression molding, and the temperature of the compression molding machine was set in a range of 130° C. to 170° C.

One hundred pieces of an outer core/inner core combination were made by a compression mold including a midplate with a movable plate ("Examples"). One hundred pieces of an outer core/inner core combination were made by a compression mold without a midplate with a movable plate ("Comparative Examples"). After the cores were finished and cooled down for at least 4 hours, all cores were cut into halves by a cutter. If the inner core was off-center in the outer core by not more than 0.8 mm, it was marked as OK. If the inner core was off-center in the outer core by more than 0.8 mm, it was marked as NG. The result were as follows:

|  | Examples | Comparative Examples |
| --- | --- | --- |
| movable insert in compression mold | Yes | No |
| Balls Marked "OK" | 98 | 92 |
| Balls Marked "NG" | 2 | 8 |
| Off-center rate | 2% | 8% |

Thus, the use of a midplate with a movable plate (or movable insert) may advantageously reduce the off-center rate of molded cores to a satisfactory extent.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A mold for manufacturing hemispherical sections for a golf ball, comprising:
    a first mold plate including a first surface having hemispherical projections and a second mold plate with a second surface facing the first surface, wherein the second surface has corresponding hemispherical cavities, wherein each pair of the projections and the cavities fit together to form a gap therebetween for molding the hemispherical sections; and
    a movable insert between the first mold plate and the second mold plate comprising apertures surrounding the hemispherical projections;
    wherein the movable insert is connected to the first mold plate;
    wherein the first surface of the first mold plate and the movable insert move relative to one another during molding of a hemispherical section for a golf ball to extend the hemispherical projections through the apertures;
    wherein the projections include a mechanical fastening device to assist with maintaining a position of a slug on the first surface; and
    wherein the movable insert receives a portion of the slug to support the slug during molding of the hemispherical section.

2. The mold of claim 1, wherein the movable insert is connected to the mold plate by at least one spring.

3. The mold of claim 1, wherein the first surface of the mold plate includes a release coating.

4. The mold of claim 1, wherein a surface of the movable insert facing the second surface surrounds the projections in a plane.

5. The mold of claim 1, wherein the movable insert is connected to the mold plate by a biasing device.

6. The mold of claim 5, wherein the biasing device is configured to bias the movable insert to a first position at which a surface of the movable insert facing the second mold plate is proximate to tops of the projections.

7. The mold of claim 5, wherein the mold is arranged such that when the mold is closed the mold plate contacts the movable insert and moves the movable insert relative to the projections.

8. The mold of claim 1, wherein the movable insert is in contact with the slug prior to and during molding of the hemispherical section.

9. The mold of claim 1, wherein the movable insert and the mechanical fastening device cooperate to maintain a position of the slug relative to the first surface prior to and during molding of the hemispherical section.

10. The mold of claim 1, wherein the movable insert and the mechanical fastening device are in contact with the slug prior to molding of the hemispherical section.

* * * * *